(12) United States Patent
Lee et al.

(10) Patent No.: US 6,171,480 B1
(45) Date of Patent: Jan. 9, 2001

(54) AUTOMATED CLOSED RECIRCULATING AQUACULTURE FILTRATION SYSTEM

(75) Inventors: Phillip G. Lee; Philip E. Turk, both of Galveston, TX (US); John L. Whitson, Boston, MA (US)

(73) Assignee: Board of Regents, The University of Texas System, Austin, TX (US)

(*) Notice: Under 35 U.S.C. 154(b), the term of this patent shall be extended for 0 days.

(21) Appl. No.: 09/337,490

(22) Filed: Jun. 21, 1999

Related U.S. Application Data

(62) Division of application No. 08/881,718, filed on Jun. 24, 1997, now Pat. No. 5,961,831.
(60) Provisional application No. 60/022,176, filed on Jun. 24, 1996.

(51) Int. Cl.[7] .................................................. B01D 17/12
(52) U.S. Cl. ........................... 210/85; 210/90; 210/96.1; 210/143; 210/150; 210/275; 210/614; 210/617
(58) Field of Search .............................. 210/85, 90, 96.1, 210/103, 143, 150, 151, 198.1, 205, 603, 605, 614, 618, 739, 741, 742, 743, 745, 746, 903, 108, 275, 617

(56) References Cited

U.S. PATENT DOCUMENTS

| | | | |
|---|---|---|---|
| 3,661,262 | | 5/1972 | Sanders ................................ 210/169 |
| 4,009,099 | * | 2/1977 | Jerris ................................... 210/605 |
| 4,052,960 | | 10/1977 | Birkbeck et al. . | 
| 4,182,675 | * | 1/1980 | Jerris ................................... 210/605 |
| 4,370,233 | * | 1/1983 | Hayes et al. ......................... 210/614 |
| 4,510,243 | * | 4/1985 | Haga et al. .......................... 210/614 |
| 4,995,980 | | 2/1991 | Jaubert ................................ 210/602 |
| 5,026,477 | | 6/1991 | Yen ..................................... 210/169 |
| 5,038,715 | | 8/1991 | Fahs . | 
| 5,081,954 | | 1/1992 | Monus . | 
| 5,084,164 | | 1/1992 | Del Rosario ......................... 210/94 |
| 5,116,489 | | 5/1992 | Englert ................................ 210/150 |
| 5,178,093 | | 1/1993 | Reese et al. . | 
| 5,302,285 | * | 4/1994 | Attaway et al. ..................... 210/605 |
| 5,304,308 | * | 4/1994 | Tsumara et al. .................... 210/614 |
| 5,353,745 | | 11/1994 | Fahs . | 
| 5,482,630 | * | 1/1996 | Lee et al. ............................ 210/605 |
| 5,558,042 | | 9/1996 | Bradley et al. . | 
| 5,667,671 | | 9/1997 | Munsch et al. ..................... 210/169 |
| 5,985,149 | * | 11/1999 | Raetz et al. ......................... 210/614 |

OTHER PUBLICATIONS

Davis and Marchant, "Pig Image Outlining Using Artificial Neuron Parameters in the Snake Contour Method," Computer and Electronics in Agriculture, 8:277–292, 1993.

Forsythe, Hanlon & DeRusha, "Pilot Large–Scale Culture of Sepia in Biomedical Research," E. Boucaud–Camou, ed. The Cuttlefish, Centre de Publications de l'Université de Caen, 313–323, 1991.

Hanlon and Forsythe, "Advances in the Laboratory Culture of Octopuses for Biomedical Research," Laboratory Animal Science, 35(1):33–40, Feb. 1985.

(List continued on next page.)

Primary Examiner—Joseph W. Drodge
(74) Attorney, Agent, or Firm—Fulbright & Jaworski LLP

(57) ABSTRACT

The present invention relates to computer automated upflow bead filter systems. These systems typically include a bead bed; in situ sensors/transducers for monitoring dissolved oxygen, differential pressure across the filter, water flow, pH, oxidation-reduction potential or any combination of these; a control system, such as a computer, operably coupled to the in situ sensors/transducers; an influent conduit below the bead bed; and an effluent conduit above the bead bed. The in situ sensors/transducers convert monitored conditions to electrical signals and at least back washing or dissolved oxygen may be continually adjusted in accordance with the electrical signals using the control system. By virtue of the control system, water flow rate or residence time, backwash frequency, and backwash duration may be continually adjusted to optimize the operation of the filter.

8 Claims, 21 Drawing Sheets

OTHER PUBLICATIONS

Heales, "Water Quality Changes During the Conditioning of Small, Closed Seawater Systems," CSIRO Marine Laboratories Report No. 176, p. 1–7, 1985.

Huntsberger, Rangarajan, and Jayaramamurthy, "Representation of Uncertainty in Computer Vision Using Fuzzy Sets," IEEE Transactions on Computers, c35(2):397–408, Feb. 1986.

International Search Report dated Oct. 15, 1997 (UTFG:206P).

Larsen et al., "A Test of Sleep Staging Systems in the Unrestrained Chimpanzee," Brain Research, 40:319–343, 1972.

Lee, "Automation of Aquaculture Systems: A Review and Practical Guide to Implementation," Engineering Aspects of Intensive Aquaculture Proceedings from the Aquaculture Symposium Cornell University, p. 284–300, Apr. 4–6, 1991.

Lee et al., "Biological Characteristics and Biomedical Applications of the Squid Sepioteuthis lessoniana Cultured Through Multiple Generations," Biol. Bull., 186:328–341, Jun. 1994.

Lee, "Computer Automation and Intelligent Control for Aquaculture," Bull. Natl. Res. Inst. Aquaculture, Supplement 1:105–110, 1994.

Lee, "Computer Automation for Recirculating Aquaculture Systems," Techniques for Modern Aquaculture, Proceedings of an Aquacultural Engineering Conference, Spokane, Washington, Sponsored by the Aquacultural Engineering Group, A Unit of ASAE, Edited by Jaw–Kai Wang Published by American Sociey of Agricultural Engineers, St. Joseph, Michigan, p. 61–70, Jun. 21–23, 1993.

Lee et al., "Research on Formulated Diets for Cephalopods," Journal of the World Aquaculture Society, 22(3):35A, Sep. 1991. (Abstract).

Lee et al., Computer Automation and Expert Systems for the Control of Recirculating Aquaculture Filtration Systems, Journal of the World Aquaculture Society, 22(3):35A, Sep. 1991. (Abstract).

Lee, "Computer Control Systems," Presented at the Texas Aquaculture Association Meeting, 1992.

Lee, "A Review of Automated Control Systems for Aquaculture and Design Criteria for Their Implementation," Aquacultural Engineering, 14(3):205–227, 1995.

Marchant and Schofield, "Extending the Snake Image Processing Algorithm for Outlining Pigs in Scenes," Computers and Electronics in Agriculture, 8:261–275, 1993.

McDonald and Chen, "Application of Morpholoical Image Processing in Agriculture," Transactions of the ASAE, 33(4):1345–1352, Jul.–Aug. 1990.

Onyango, Marchant and Ruff, "Model Based Location of Pigs in Scenes," Computers and Electronics in Agriculture, 12:261–273, 1995.

Ruff, Marchant, and Frost, "Fish Sizing and Monitoring Using a Stereo Image Analysis System Applied to Fish Farming," Aquacultural Engineering, 14:155–173, 1995.

Shing and Jang, "ANFIS: Adaptive–Network–Based Fuzzy Inference System," IEEE Transactions on Systems, Man and Cybernetics, 23(3) May/Jun. 1993.

Turk et al., "Aspects of Feeding, Growth and Survival of the European Squid Loligo Vulgaris Lamarck, 1799, Reared Through the Early Growth Stages," Vie Milieu, 36(1):9–13, 1986

Watson, ed., "The Marine Biomedical Institute: 1991–1992 Biennial Bulletin," UTMB The University of Texas Medical Branch at Galveston.

Whitesell and Lee, "A Plug–and–Play Machine Vision System for Aquaculture," Scientific Computering & Automation, Aug. 1994, p. 29–32.

Yang et al., "Laboratory Rearing of Loligo opalescens, the Market Squid of California," Aquaculture, 31:77–88, 1983.

Beddow, Ross, Marchang, "Predicting salmon biomass remotely using digital stereo–imaging technique," Aquaculture, 146:189–205, 1996.

Boyle, ´´sgeirsson, and Pigott, "Advances in the Development of a Computer Vision Fish Biomass Measurement Procedure for Use in Aquaculture," In: Techniques for Modern Aquaculture, Wang, J.K., ed., American Society of Agricultural Engineers, St. Joseph, MI, pp. 382–392, 1993.

Chen and Malone, "Suspended Solids Control Recirculating Aquacultural Systems," In: Engineering Aspects of Intensive Aquaculture, Proceedings from the Aquaculture Symposium at Cornell University, Northeast Regional Aquacultural Engineering Service, Ithaca, NY NRAES, pp. 170, 1991.

Chu, Chen, and Chien, "A Computerized System for Integrated Measurements of Length, Width, and Weight of Aquatic Organisms," In: Techniques for Modern Aquaculture, Wang, J.K., ed., American Society of Agricultural Engineers, St. Joseph, MI, pp. 362–371, 1993.

Dreschel, Bauer, Koller, Sager, "A Prototype Closed Aquaculture System for Controlled Ecological Life Support Applications," In: Engineering Aspects of Intensive Aquaculture, Proceedings from the Aquaculture Symposium at Cornell University, Northeast Regional Aquacultural Engineering Service, Ithaca, NY NRAES, pp. 48–56, 1991.

Ebeling, "A Computer Based Water Quality Monitoring and Management System for Pond Aquaculture," In Engineering Aspects of Intensive Aquaculture, Proceedings from the Aquaculture Symposium at Cornell University, Northeast Regional Aquacultural Engineering Service, Ithaca, NY NRAES, pp. 233–248, 1991.

Ebeling, "Engineering Design and Construction Details of Distributed Monitoring and Control Systems for Aquaculture," In: Aquacultural Engineering and Waste Management, M. Timmons, ed., Northwest Regional Aquaculture Engineering Service (NRAES) No. 100, Cornell University, Ithaca, NY, pp. 1–22, 1995.

Kaiser and Wheaton, "Engineering Aspects of Water Quality Monitoring and Control," In: Engineering Aspects of Intensive Aquaculture, Proceedings from the Aquaculture Symposium at Cornell University, Northeast Regional Aquaculture Engineering Service, Ithaca, NY NRAES, pp. 201–232, 1991.

Lee, "Automation of Aquaculture Systems: A Review and Practical Guide to Implementation," In: Engineering Aspects of Intensive Aquaculture, Proceedings from the Aquaculture Symposium at Cornell University, Northeast Regional Aquacultural Engineering Service, Ithaca, NY NRAES, pp. 284, 1991.

Lee, Turk, and Whitson, "Automated Control of a Closed, Recirculating Mariculture System with Attached Denitrification Filter," In: Acquacultural Engineering and Waste Management, M. Timmons, ed., Northwest Regional Aquaculture Engineering Service (NRAES) No. 100, Cornell University, Ithaca, NY, pp. 23–39, 1995.

Lee, Hanlon, Turk, "Squid and Cuttlefish Mariculture: A Reality," Invited lecturer, Third Asian Fisheries Forum, Oct. 26–30, Singapore, 1992.

Lee, "Recent Advances in Instrumentation and Control Systems for Aquaculture," Aquaculture Engineering Symposium, World Aquaculture Society Meeting, San Diego, CA, Feb. 4–7, 1995.

Lee, "Computer Automation for Aquaculture Systems," Aquaculture Europe '95—AquaNor '95, Trondheim, Norway, Sep. 1995.

Lee, "Computer automation for recirculating systems," In: *Techniques for Modern Aquaculture*, J.K. Wang, ed., American Society of Agricultural Engineers, St. Joseph, MN, pp. 61–70, 1993.

Lee, "Advances in Environmental Control Systems for Aquaculture," US–Japan Joint Natural Resource Panel Meeting, Corpus Christi, TX, Oct. 9, 1995.

Losordo and Westerman, "An Analysis of Biological, Economic, and Engineering Factors Affecting the Cost of Fish Production in Recirculating Aquaculture Systems," In: *The Proceedings of a Workshop on of High Density Recirculating Aquaculture Systems*, R.M. Malone, ed., National Sea Grant College Program and Louisiana State University, Baton Rouge, LA, Sep. 25–27, pp. 1–9, 1991.

Losordo, "An Introduction to Recirculating Production Systems Design," In: *Engineering Aspects of Intensive Aquaculture*, Proceedings from the Aquaculture Symposium at Cornell University, Northeast Regional Aquacultural Engineering Service, Ithaca, NY NRAES, pp. 32–47, 1991.

Munasinghe, Gempesaw, Bacon, Lussier, Konwar, "AMACS: A User Friendly Windows Based Aquaculture Monitoring and Controlling Software," In: *Techniques for Modern Aquaculture*, Wang, J.K., ed., American Society of Agricultural Engineers, St. Joseph, MI, pp. 71–80, 1993.

Naiberg, Petrell, Savage, Neufeld, "A Non–Invasive Fish Size Assessment Method for Tanks and Sea Cages Using Stereo Video," In: *Techniques for Modern Aquaculture*, Wang, J.K., eds., American Society of Agricultural Engineers, St. Joseph, MI, pp. 372–381, 1993.

Perkins and Lester, "A machine vision system for aquaculture genetics," *World Aquaculture*, 2(1):63–65, 1990.

Petrell, Neufeld, and Savage, "A Video Method for Noninvasively Counting Fish in Sea Cages," In: *Techniques for Modern Aquaculture*, American Society of Agricultural Engineers, St. Joseph, MI, pp. 352–361, 1993.

Rosenthal and Black, "Recirculation Systems in Aquaculture," In: *Techniques for Modern Aquaculture*, Wang, J.K., ed., American Society of Agricultural Engineers, St. Joseph, MI, pp. 284–294, 1993.

Rusch and Malone, "A Micro–Computer Control and Monitoring Strategy Applied to Aquaculture," In: *Techniques for Modern Aquaculture*, Wang, J.K., ed., American Society of Agricultural Engineers, St. Joseph, MI, pp. 53–60, 1993.

Timmons, Chen, Weeks, "An Application Model of Foam Fractionators Used in Aquaculture," In: *The Proceedings of a Workshop on of High Density Recirculating Aquaculture Systems*, R.M. Malone, ed., National Sea Grant College Program and Louisiana State University, Baton Rouge, LA, pp. 68–79, Sep. 25–27, 1991.

Turk, Lawrence, Lee, "Design and operation of an environmentally isolated, marine shrimp broodstock culture system using closed, recirculating water filtration," In: *Advances in Aquacultural Engineering*, Northeast Regional Agricultural Engineering Service, Cornell, NY, NRAES, 105:209–218, 1997.

Van Gorder, "Optimizing Production by Continuous Loading of Recirculating Systems," In: *The Proceedings of a Workshop on of High Density Recirculating Aquaculture Systems*, R.M. Malone, ed., National Sea Grant College Program and Louisiana State University, Baton Rouge, LA, pp. 10–15, Sep. 25–27, 1991.

Westerman, Losordo, and Wildhaber, "Evaluation of Various Biofilters in an Intensive Recirculating Fish Production Facility," In: *Techniques for Modern Aquaculture*, Wang, J.K., ed., American Society of Agricultural Engineers, St. Joseph, MI, pp. 326–334, 1993.

Whitsell and Lee, :A machine vision system for aquaculture: real–time identification of individual animals and estimation of animal activity, In: *Advances in Aquacultural Engineering*, Northeast Regional Agricultural Engineering Service, Cornell, NY, NRAES, 105:112–128, 1997.

Whitson, Turk, Lee, "Emergent properties of computer automated environmental control and water filtration systems for aquaculture," In: *Advances in Aquacultural Engineering*, Northeast Regional Agricultural Engineering Service, Cornell, NY, NRAES, 105:129–137, 1997.

Yang, Hanlon, Lee, Turk, "Design and function of closed seawater systems for culturing loliginid squids," *Aquacultural Engineering*, 8:47–65, 1989.

* cited by examiner

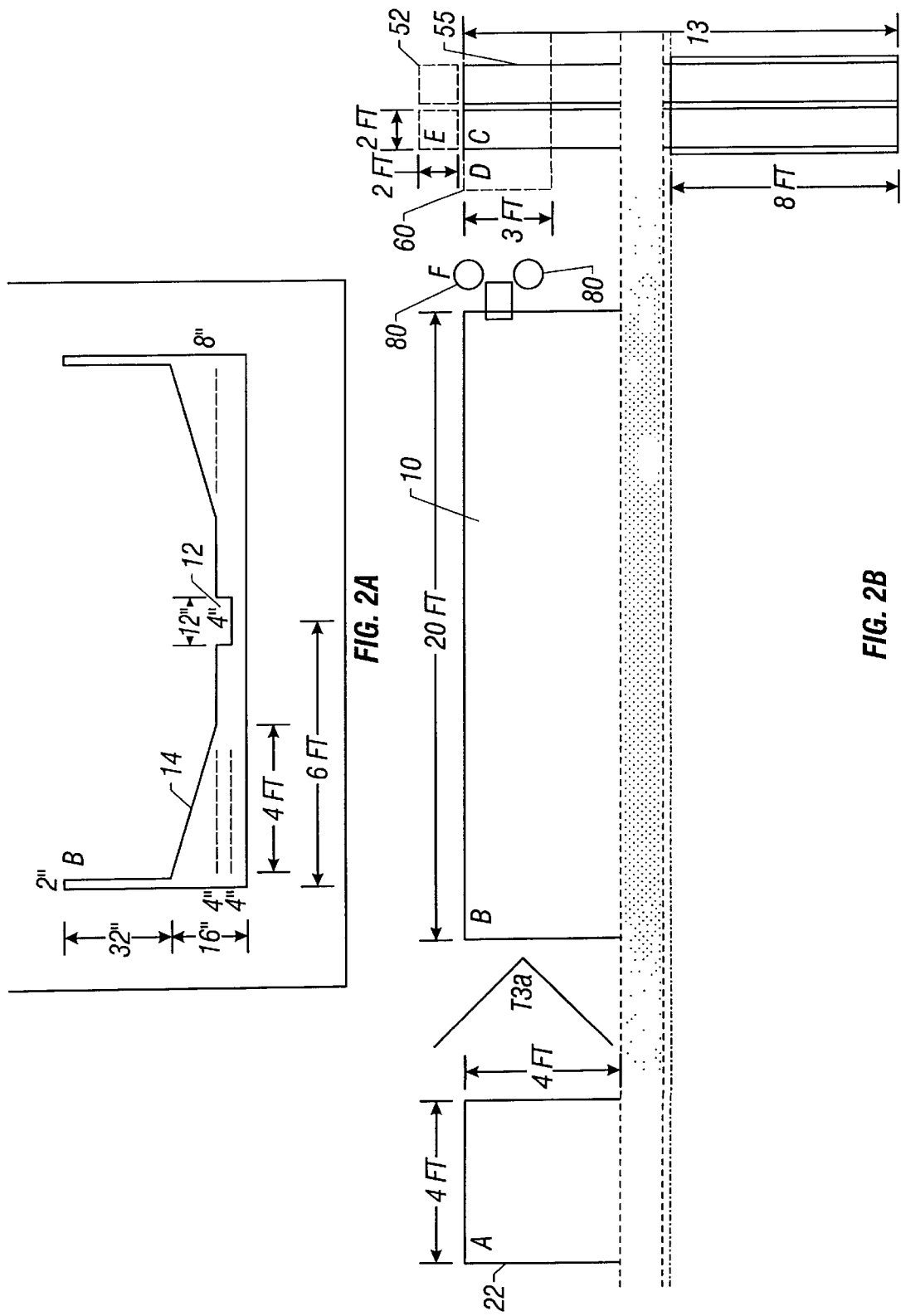

US 6,171,480 B1

AUTOMATED CLOSED RECIRCULATING AQUACULTURE FILTRATION SYSTEM

This application is a division of Ser. No. 08/881,718, filed on Jun. 24, 1997, now U.S. Pat. No. 5,961,831which claims the benefit of Provisional Application 60/022,176, filed on Jun. 24, 1996.

BACKGROUND OF THE INVENTION

This invention relates to automated aquatic systems for the culture of aquatic species.

Conventional aquaculture systems typically require significant amounts of human intervention in order to enable a species of interest to be grown and cultured. Such systems are not "closed," instead requiring partial water changes and the like. In large systems, significant amounts of water may need to be used and disposed of. A system which is automated and truly closed would be advantageous.

SUMMARY OF THE INVENTION

This invention provides a solution to one or more of the problems and/or deficiencies described above.

In one respect, the present invention is an automated aquaculture system which comprises: a tank; a prefilter system connected to the tank which comprises a particulate is filter, a foam fractionator and a carbon filter; an aerobic biofilter; a pump that receives effluent from the prefilter system and moves the effluent to the aerobic biofilter; a source of ultraviolet light that is in cooperation with the aerobic filter and that treats water from the aerobic filter, wherein the source is connected to the tank so that treated water is returned to the tank; an anaerobic biofilter that is connected to the aerobic biofilter for receiving effluent and connected to the prefilter system for introducing effluent to the prefilter system; a video camera directed into the tank for receiving information; and a computer that receives information from the cameras and other sensors in the system and that controls the operation of the system.

In another respect, this invention is a process useful for culturing an aquatic species, comprising:

housing the aquatic species in a tank containing water;

introducing water from the tank into a particulate filter;

introducing effluent from the particulate filter to a foam fractionator;

introducing effluent from the foam fractionator to a carbon filter;

pumping effluent from the carbon filter to an aerobic biofilter;

irradiating effluent from the aerobic biofilter with ultraviolet radiation;

treating effluent from the aerobic biofilter in an anaerobic biofilter and returning effluent from the anaerobic biofilter to the system; and introducing effluent from the irradiating step to the tank.

BRIEF DESCRIPTION OF THE DRAWINGS

FIG. 2A depicts an end view of a culture tank which shows a trough that runs longitudinally down the middle of the tank and which shows that the floor of the tank is graded at an angle so that debris flows toward the trough when the tank is agitated appropriately.

FIG. 2B depicts a side view of an aquaculture system.

FIG. 8A depicts the pH measurements during the culture period. The horizontal line indicates the desired standard of >8.0.

FIG. 8B depicts the ammonia measurements during the culture period. The horizontal line indicates the upper acceptable limit.

FIG. 8C depicts the nitrite measurements during the culture period. The horizontal line indicates the upper acceptable limit.

FIG. 8D depicts the nitrate measurements during the culture period. The horizontal line indicates the upper acceptable limit.

FIG. 10A depicts the nitrate concentration, indicating the removal of nitrate when the denitrifying bioreactor was added. Triangles represent inflow and squares represent outflow.

FIG. 10B depicts the nitrite concentration, indicating the removal of nitrite when the denitrifying bioreactor was added. Triangles represent inflow and squares represent outflow.

FIG. 10C depicts the hydrogen sulfide concentration, indicating the removal of hydrogen sulfide when the denitrifying bioreactor was added. Triangles represent inflow and squares represent outflow.

DETAILED DESCRIPTION OF INVENTION

This invention is the merging of artificial intelligence of established process control technology and aquatic systems design to provide closed, recirculating water filtration systems to the aquaculture/aquarium industries. Closed, recirculating aquaculture filtration systems are a collection of subsystems that provide complete ecological life support for aquatic organisms, eliminating deliberate replacement of water yet maintaining acceptable water quality. Implied in this definition is the complete removal of biologically generated soluble and suspended pollutants and conservation of water resources. The definition does not extend to water lost to evaporation. It is assumed that evaporated water is free of environmental pollutants and its replacement will not result in substantial resource depletion. The invention relates to machine/computer control of the processes that optimize the growth and reproduction of aquatic organisms in "closed-loop" biological filtration systems. The invention works by continually monitoring of physical factors affecting physiological requirements of the cultured organisms and continually adjusting necessary to meet these requirements; some factors (e.g., dissolved oxygen, pH, metabolites and salinity) will be held within critical limits while others (e.g., temperature and light cycle) may be changed to alter growth characteristics and/or periodicity of reproduction.

Figures 1, 11:
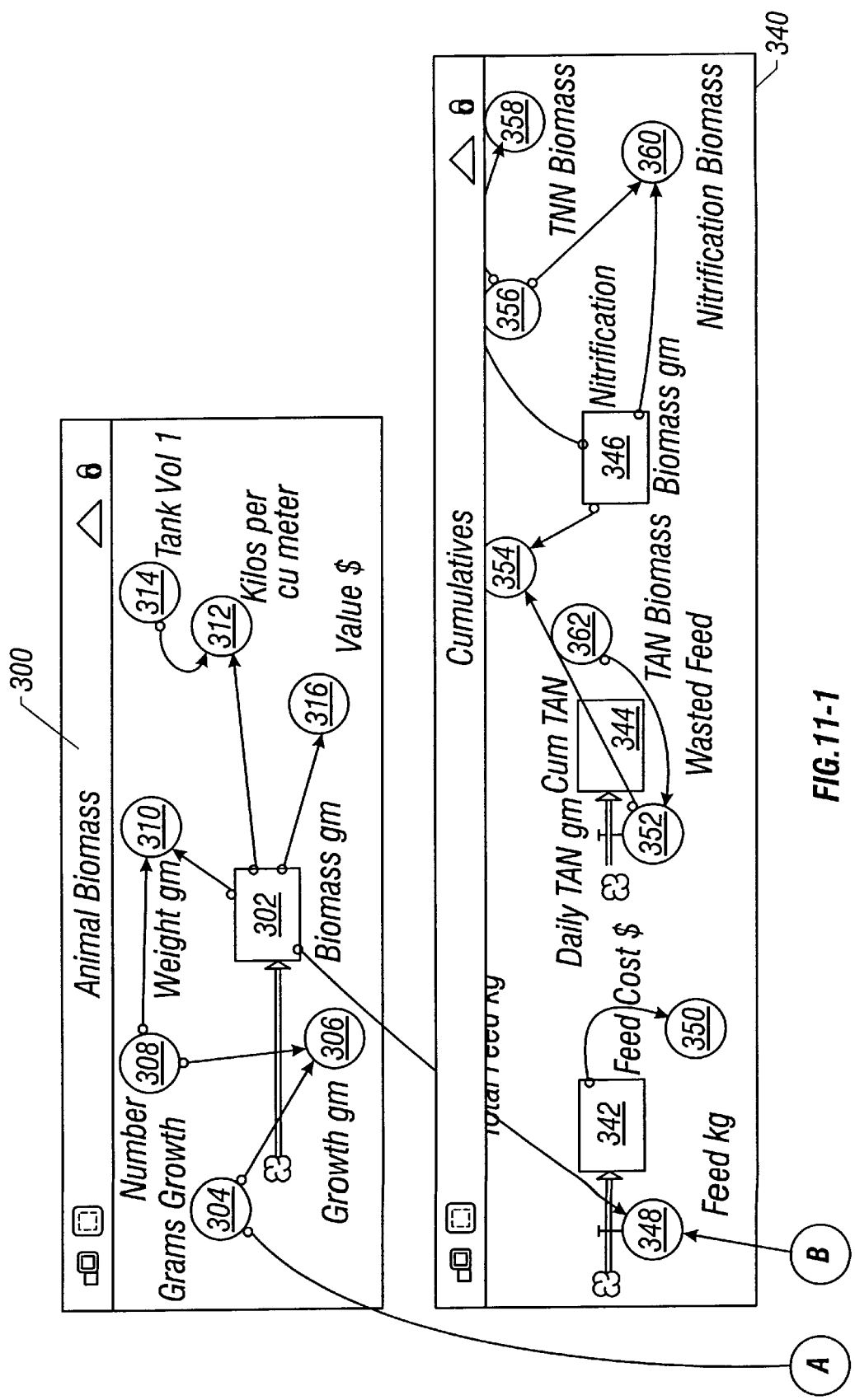
FIG. 11 depicts a model describing the function of the closed aquaculture system.
Figures 2, 11:
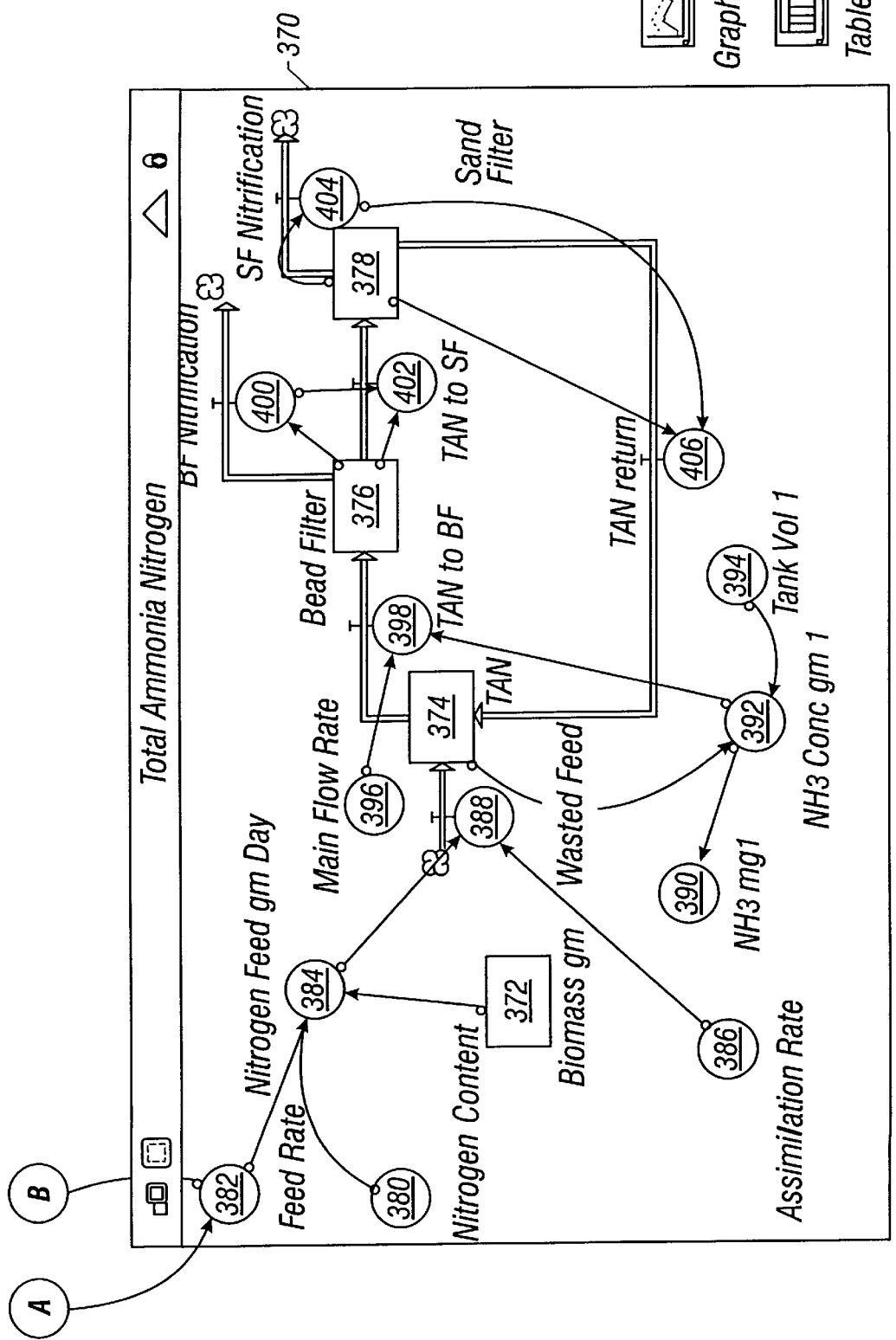
Figures 3, 11:
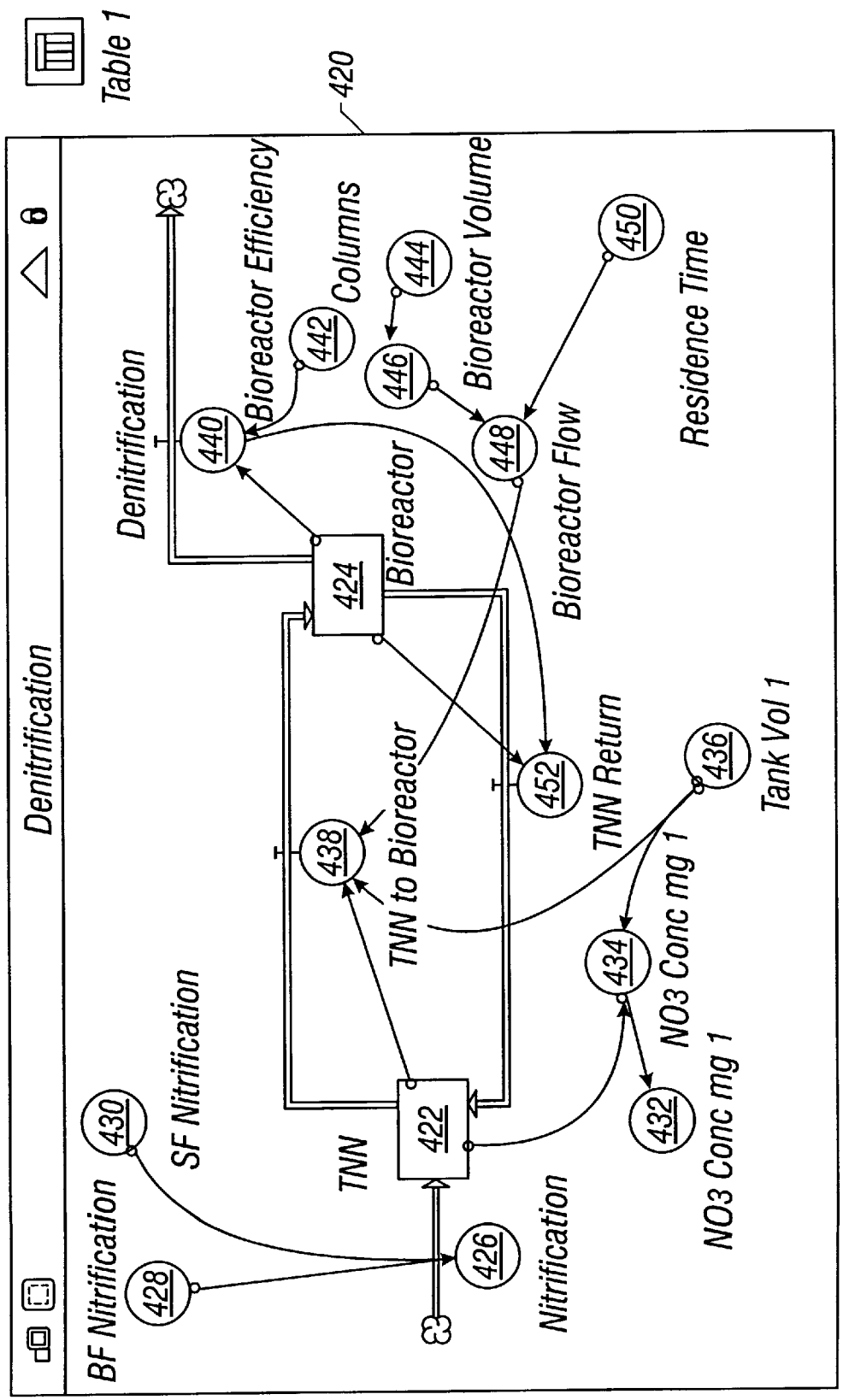

A closed, recirculating aquaculture system is a collection of tank(s), plumbing, filtration devices, and pumps (FIGS. 1A, 2A and 2B). The culture tanks may be of any size, shape and material appropriate to the species in culture. Plumbing may be of any size, shape and material compatible with the overall tank design. The filters used in aquaculture systems generally fall into five types and may be used in any combination appropriate to the species in culture. The filter types arc: (1) particulate removal-screens, settling basins, media filled traps and to some extent, physical/chemical adsorption devices (foam fractionators and activated carbon); (2) physical adsorption-foam fractionators (i.e., protein skimmers) of all designs; (3) chemical adsorption-activated carbon, zeolites and other synthetic media and membranes used to trap molecules based on size or electrical charge; (4) biological-media beds that support bacteria for oxidizing organic wastes and reducing the end product(s) to carbon dioxide and elemental nitrogen. In addition, denitrification (the conversion of nitrate into nitrogen gas) can occur in biological filter beds under anaerobic conditions; and (5) irradiation/oxidation—a group of devices producing ultraviolet light (UV), ozone or both.

Pumps may be any of a number of devices used to move water through the system at a rate compatible with the overall tank design and animals. Included in this category are water pumps, air blowers and compressors. A natural dichotomy between mechanical, pump-driven systems and airlift-driven systems occurs in the design of filtration. Airlift-driven systems operate at very low head pressure but with flow volumes equal to pump-driven systems that operate with high head pressure. There are a number of compelling reasons (e.g., economy, simplicity and durability) to use airlifts in aquaculture systems. However, aquaculture filtration systems are typically pump-driven. Filters designed for high pressure pumping are readily available and entirely adaptable to the requirements of this invention but they are not easily adapted to airlift-driven systems. Therefore, filters described as part of this embodiment are low pressure designs developed for airlift-driven systems but they are appropriate for pump-driven applications.

All systems and subsystems are integrated by an intelligent control system composed of sensors, communication devices, computer hardware, software interface and expert system. These control systems: (1) acquire real-time data directly from production systems, (2) transform the inputs mathematically into process models, (3) interface these models with expert systems that assume the role of a human expert, and (4) apply decisions of the expert system to control critical processes. Therefore, the development of automated aquaculture systems should be driven by the expansion of intensive aquaculture systems and the increased availability of affordable process control hardware and software. Success in designing, a pragmatic and affordable automated control system will be widely applicable because it will greatly enhance water management, reduce costs associated with manual monitoring and reduce significantly the chance of catastrophic system failures. The modern commercial aquaculture facility has become a sophisticated network of interrelated processes and subprocesses that require the transfer of raw materials (e.g., oxygen, heat, feeds and water) into a high-quality final product (edible high protein flesh) at a rapid rate. These processes are comparable to the physical processes managed by manufacturing industries. They require many simple (step-wise) and complex (side-loop) processes to be integrated spatially and temporally in order to maximize product and minimize failures. Automation of intensive aquaculture systems will allow US companies to: (1) compete with world commodity markets by locating production closer to markets, (2) improve environmental control, (3) reduce catastrophic losses, (4) avoid problems with environmental regulations on effluents, (5) reduce management and labor cots significantly, and (6) improve product quality and consistency. The application of process control technology and the concurrent need for aquaculture-specific expert systems (a computer program that supplies answers or solutions based on available information, by attempting to duplicate the human thought process) is central to continued intensification of the aquaculture industry.

In addition, the invention includes a machine vision subsystem that is a process by which organisms may be modeled for the purposes of detection, surveillance, measurement and quality assessment in a machine vision system. The machine vision subsystem is the application of an adaptive-neuro fuzzy inference system (ANFIS) to the problems of singulation (identifying an individual in a frame) and segmentation (separating an object from the background) and intelligent continuous monitoring in an aquacultural or agricultural system.

In an automated aquaculture system, the machine vision subsystem may be used to incorporate animal data into the control parameters for the system. This animal data may include size, growth rates, activity level, activity classification (e.g., mating behavior, egg laying and molting). Animal data can be used as an environmental indicator (e.g., water quality alarms) or as a control variable (e.g., mating behavior causes an increase in feeding frequency) for an automated system. The machine vision subsystem is the necessary missing link between the theoretical use of machine vision in aquaculture and the ability for the application of machine vision technology in any production facility. Production facilities where organisms are products or producers (agriculture, aquaculture, and biotechnology) will benefit the most since this invention makes possible the use of machine vision for scenes and target objects which are irregular and complex.

The machine vision subsystem consists of a process (algorithm) whereby features (whether they are part of the a priori knowledge of target object morphology for the purposes of object recognition and classification, the results of a continuous activity monitor, or the test for animal or product marketability) are grouped with a cooperative effort of supervised learning (neural networks) and a fuzzy inference system (FIS). The supervised learning may take place in batches, with the end product being a FIS which will operate (make decisions) without the continued application of machine learning; or, the learning may take place on line whereby the Neural Network will continue to modify the FIS within predetermined parameters, and thus improve performance and the discernment capabilities of the system via unsupervised learning.

This invention, a computer automated closed, recirculating aquaculture filtration system (CACRAFS), is recognized as utilitarian to the industry and necessary to the environment. It was previously unattainable because artificial intelligence capable of the complex "decision making" to control biological filtration was lacking. Biological filtration of aquaculture water is essential to the health and survival of aquatic animals. Automated control of the denitrification subprocess was developed and patented in U.S. Pat. No. 5,482,630, incorporated herein by reference. The final piece is contributed by the machine vision subsystem.

Filtration Subsystems

The serial arrangement of filters (FIG. 1) is ordered such that effluent water is contracted in the following plug-flow order: (1) mechanical or particulate filtration (e.g., submerged bed, upflow sand or bed filter, fluidized sand filter, semipermeable membrane, flushing filter and trickling filter); (2) physical adsorption or foam fractionation (e.g., protein skimmers); (3) chemical (e.g., activated charcoal, zeolite or any chelating or sequestering compound); (4) biological (e.g., aerobic or anaerobic bacterial beds that function as heterotrophic or chemoauxotrophic bacterial assemblages); and (5) sterilization (e.g., ultraviolet light, ozone, chlorine or other chemical oxidants).

The sequence is appropriate for all forms of aquaculture filtration components as listed above. A typical arrangement of the system is shown in FIG. 2B in which the prefilter tank 22 (including the particulate filter, foam fractionator and activated carbon) have dimensions of 4'W×8'L×4'H. The culture tank 10 has dimensions of 12'W×20'L×4'H. The airlift casing 55 is 24" in diameter×13'H and the biofilter 60 is 8'W×18L×3'H. The head tank 52 is 2'W×4'L×2'H. Also shown in FIG. 2B are two ultraviolet light sterilizers 80.

Filtration efficiency is managed by a distributed control system, DCS (using artificial intelligence) so that water quality is maintained at acceptable standards for any is aquatic species in culture. The five filter types are automated in the following manner: (1) the efficiency of mechanical or particulate filtration can be improved by monitoring differential pressure across the filter, water flow through the filter, oxidation-reduction potential, dissolved oxygen and filter bed expansion volume and by then controlling water flow rate or residence time, backwashing frequency and duration; (2) the efficiency of physical adsorption can be improved by monitoring water flow through the filter, total gas pressure in the effluent, gas injection and bubble height and by then controlling water flow rate or residence time, cycle time, gas source (e.g., blower air, compressed gas or ozone) and gas injection rate; (3) the efficiency of chemical filtration can be improved by monitoring water flow through the filter and differential pressure across the filter and by then controlling water flow rate or residence time; (4) the efficiency of biological filtration (e.g., aerobic or anaerobic) can be improved by monitoring water flow through the filter, differential pressure across the filter, dissolved oxygen, pH, oxidation-reduction potential, carbon dioxide and water level changes depending on the type of biological filter used (e.g., submerged, upflow, fluidized, triolding or flushing) and by then controlling water flow rate or residence time, dissolved oxygen injection, buffer injection, backwashing frequency and duration; and (5) the efficiency of sterilization can be improved by monitoring water flow through the filter, light intensity and wavelength (ultraviolet) and oxidation-reduction potential (ozone and chemical oxidants) and by then controlling water flow rate or residence time and chemical injection (ozone and chemical oxidants).

Figure 4:
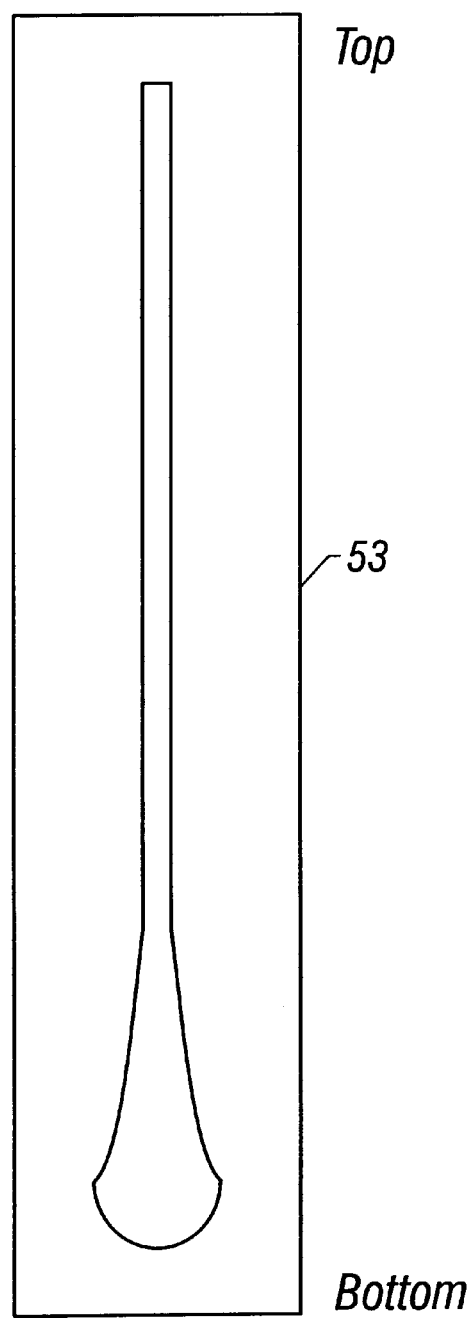
FIG. 4 depicts the design of the opening that releases air into the airlift of an aquaculture system.

Airlift pump design and operation are improved by: (a) the design of the airlift injector. Air bubble size configuration influences airlift efficiency. The diffuser orifice is a modified tear drop shape beginning as a slit at the top to produce smaller (<1–10 mm id.), slower rising bubbles then expanding to a circular base to produce larger bubbles (10–30 mm id.) (FIG. 4); (b) the air-water slurry exiting the top of the airlift pipe is deflected away from the top of the pipe by a cone-shaped structure. The cone-shaped structure deflects water away from the top of the airlift so that it does not fall straight down and impede water flow.

Figure 1:
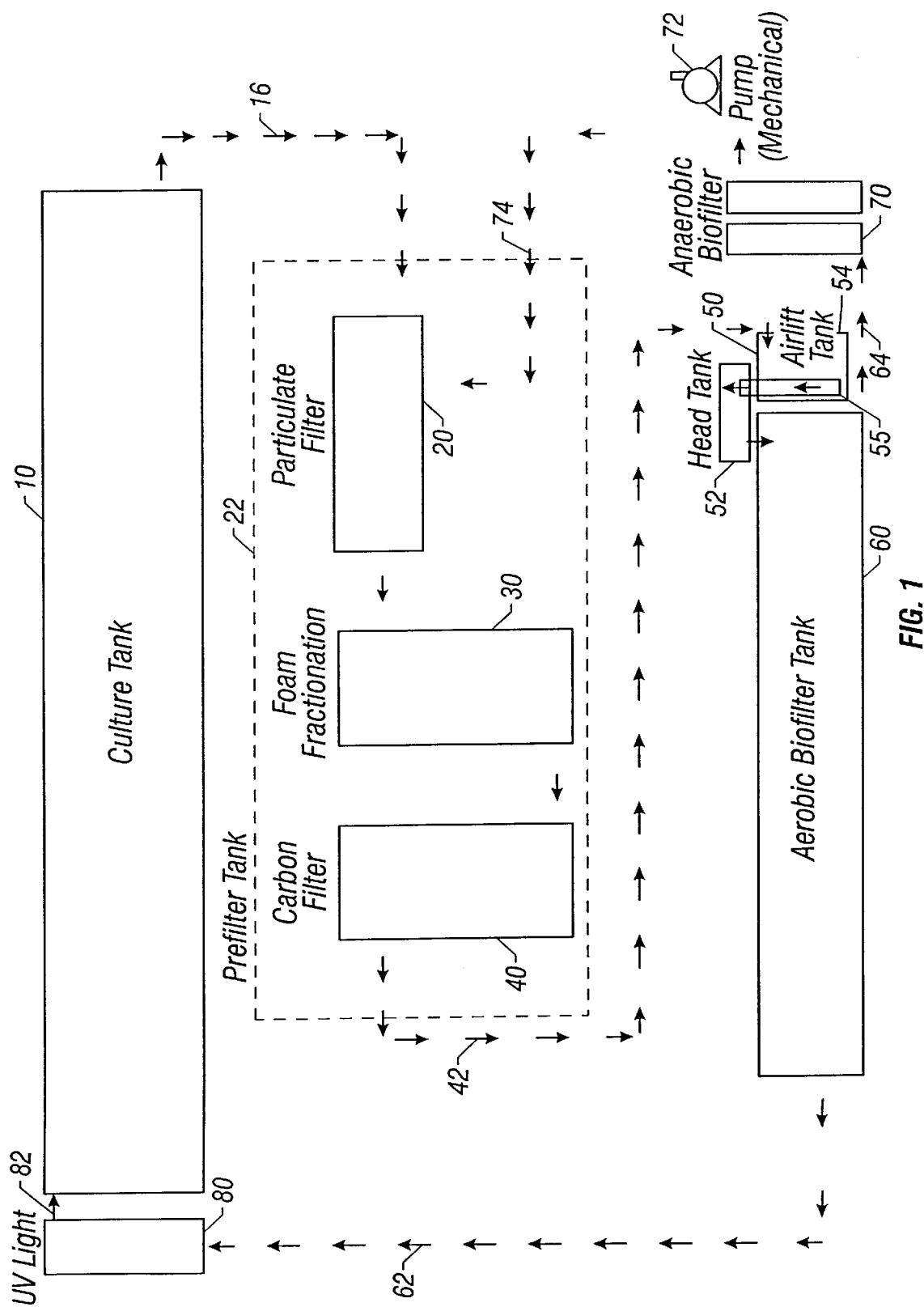
FIG. 1 shows a closed aquaculture system including a culture raceway (tank), prefilter system, pumping means, aerobic biofilter. anaerobic biofilter, mechanical pump connected to the anaerobic biofilter, a source of UV light, and connections between the various components which are depicted by arrowed lines.

In FIG. 1 there is depicted a system which includes a raceway (culture tank) 10. The culture tank 10 may have a configuration as depicted in FIG. 2A, which includes a trough 12 and angled floor 14. In FIG. 1, effluent from culture tank 10 enters a prefilter system 22 that includes particulate filter 20, foam fractionator 30 and carbon filter 40. The culture tank 10 is connected to the prefilter system by a conduit which is depicted by arrowed lines 16. The particulate filter 20 serves to filter larger debris from the culture tank. Effluent from particulate filter 20 flows into foam fractionator 30 where foam is removed. The foam fractionator 30 may be of the configuration depicted in FIG. 5. Effluent from the foam fractionator 30 then enters carbon filter 40 for additional prefiltration. Effluent from the carbon filter 40 then flows through a conduit depicted by arrowed line 42 to an airlift 50. The airlift is depicted in greater detail in FIG. 5, as well as FIG. 4, which shows the design of the opening that releases air into the airlift. The airlift 50 is composed of a airlift tank 54 and a vertical pipe 55 which dimensions may vary depending on the size of the system. At the base of the pipe for airlift 55, air injector 53 introduces air which rises and thereby draws water up the airlift, thereby providing pumping action and circulation. Water from airlift 50 enters head tank 52 and then pours into aerobic biofilter 60. The aerobic biofilter 60 may contain gravel, which serves to support microorganisms which serve to perform the aerobic biofiltration. Effluent from aerobic biofilter 60 then flows into UV light source 80 via conduit 62. The UV light source 80 irradiates the water to thereby kill microorganisms and pathogens that may be found in the water. Effluent from the UV light source 80 is returned to the culture tank 10 via conduit 82. Intermittently, effluent from the aerobic biofilter 60 is sent to anaerobic biofilter 70 via conduit 64. The anaerobic biofilter 70 may be of a design as depicted in U.S. Pat. No. 5,482,630. Effluent from the anaerobic biofilter is then pumped via mechanical pump 72 through conduit 74 into particulate filter 20. The anaerobic biofilter 70 serves to remove nitrates from the system.

Figure 5:
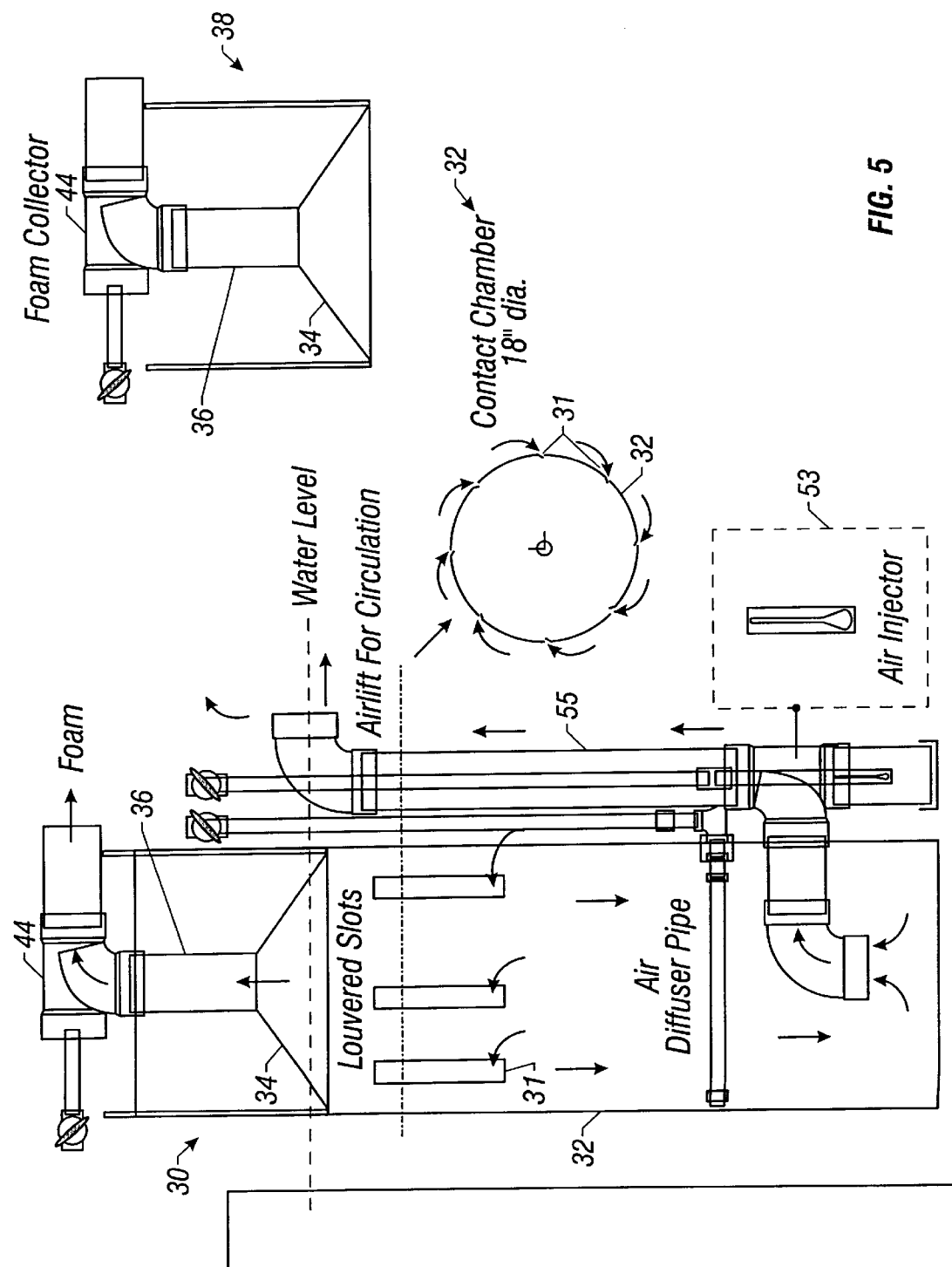
FIG. 5 depicts a foam fractionator.

The foam fractionator 30 (protein skimmer) has louvered slots 31 positioned on the contact chamber 32 several centimeters below the water level of the vessel holding (FIG. 5). The louvered slots are directed inward so that water entering the contact chamber 32 is deflected to form a circular pattern as it travels downward to the exit. This design: (1) increases water residence time for more efficient organic removal; (2) allows small air bubbles to coalesce into larger bubbles that can rise faster against the countercurrent of water, and (3) concentrates the bubble mass in the center of the cylinder so that it does not escape through the louvers.

Figure 6:
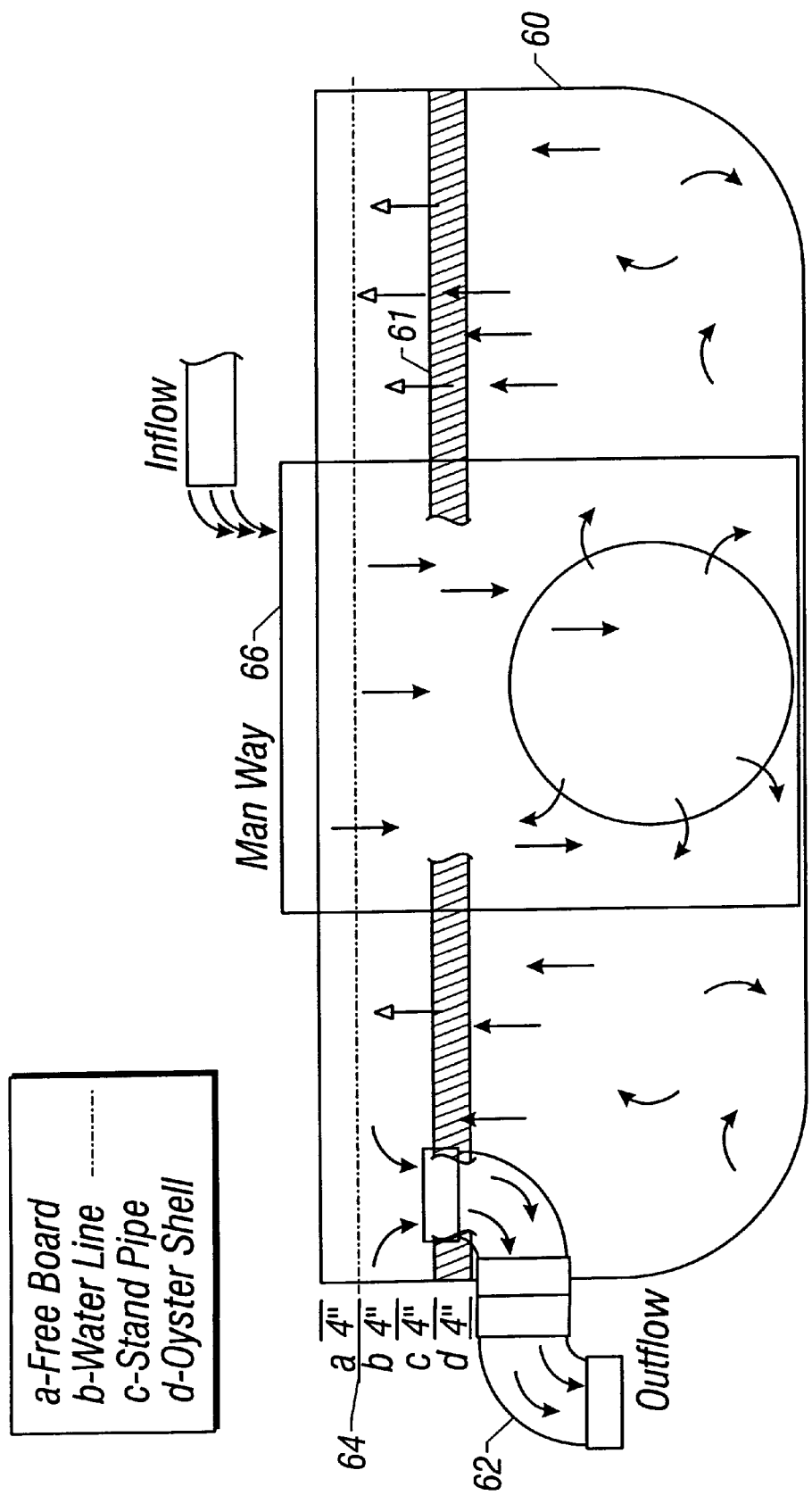
FIG. 6 depicts a submerged aerobic biological filter.
Figure 7:
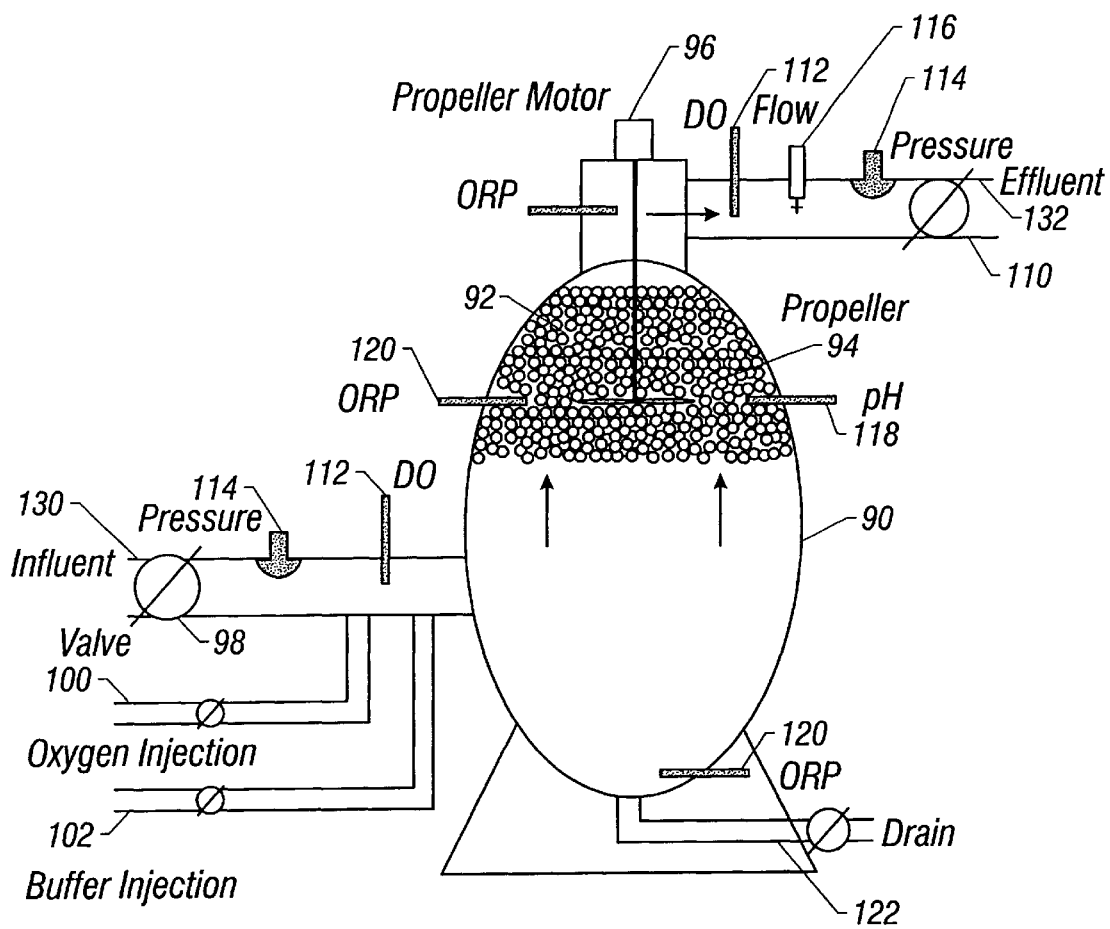
FIG. 7 depicts an automated aerobic upflow bead filter.
Figure 8A:
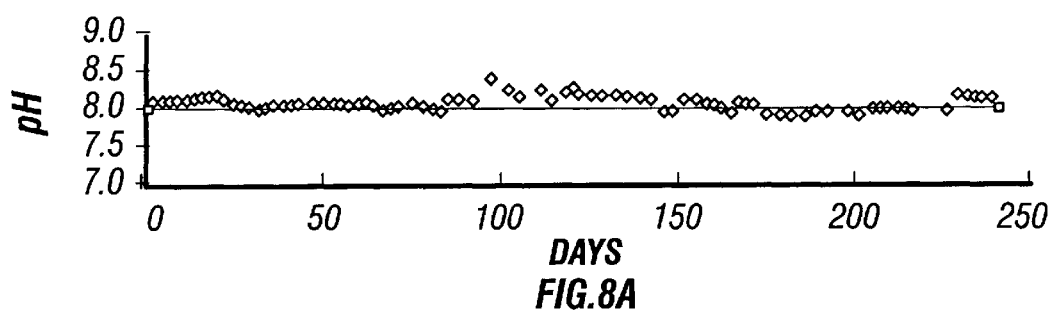
FIG. 8A–FIG. 8D depict the water quality history from the system of FIG. 1. Representative measurements are shown from the hatchery (days 1–100) and raceway (days 101–242). The biomass increased from <10 grams at day 1 to >200 gms per cubic meter in the last third of the culture period.
Figure 8B:
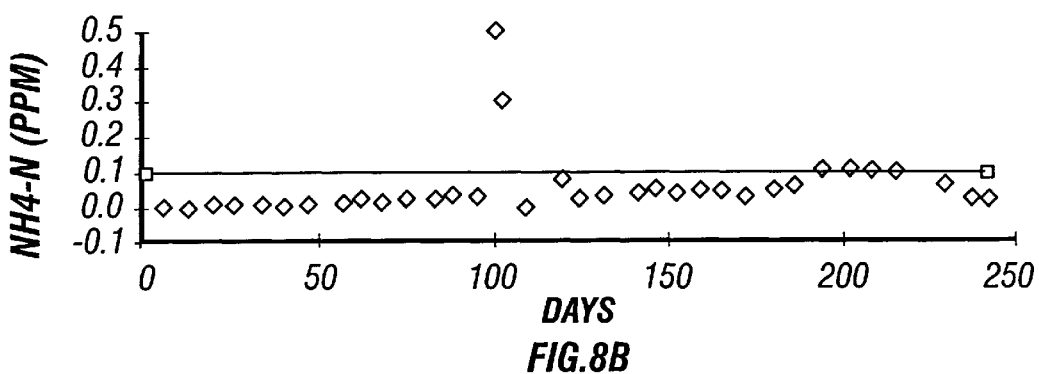
Figure 8C:
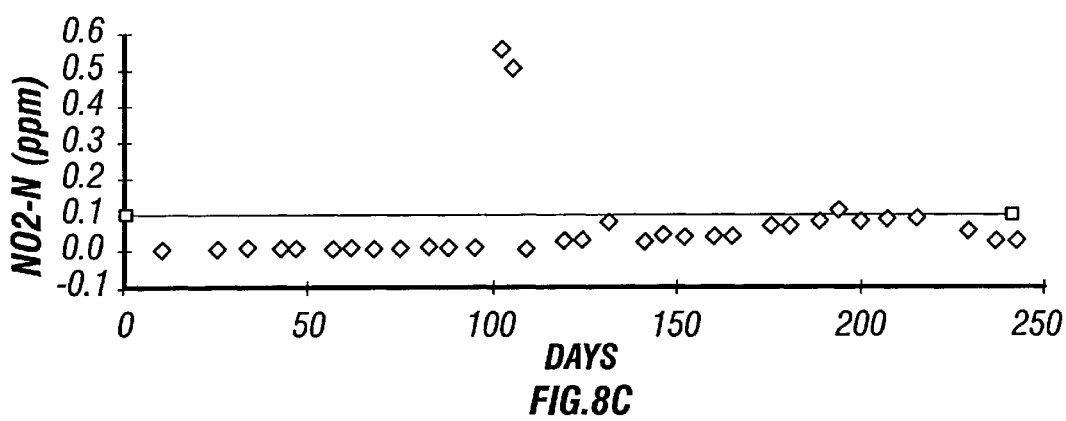
Figure 8D:
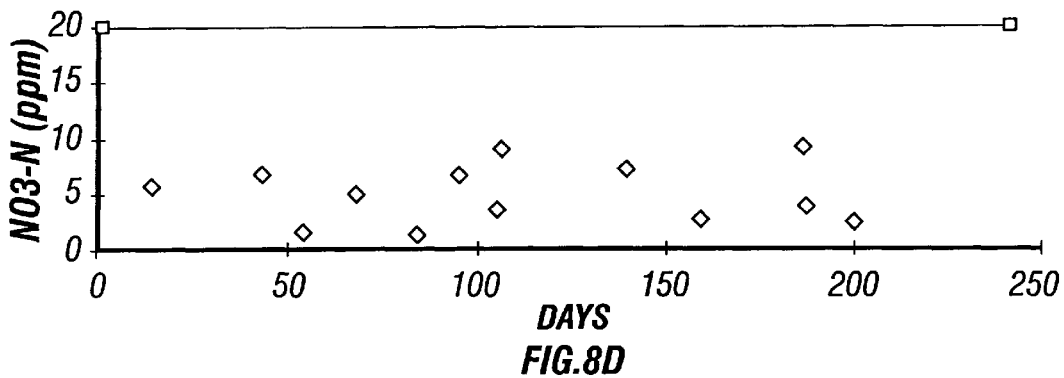

The design of the submerged biological filter bed (FIG. 6) differs from typical submerged beds in several key characteristics: (1) the bed 61 is elevated so that it is just submerged at the surface; and (2) incoming (untreated) water is injected below the bed and rises through it (FIG. 6). This configuration: (a) reduces compaction of the bed and subsequent reduction of flow; (b) forces organic laden water to contact the dark side of the bed thus limiting the growth of heterotrophs, and (c) causes the bottom of the bed to contact oxygen rich water thus preventing the development of anaerobic regions deep in the bed. The design of the automated upflow bead filter 90 (FIG. 7) is also unique in that in situ sensors monitor the bacterial metabolism in the bed 92 and are used to control the environmental parameters, residence time, and backwash schedule. The embodiment shown in FIG. 7 includes a propeller 94 driven by a propeller motor 96. A valve 98 controls influent and separate conduits are provided for the addition of oxygen 100 and buffer 102. Another valve 110 controls effluent. In situ sensors monitor dissolved oxygen 112, differential pressure 114, water flow 116, pH 118, and oxidation-reduction potential 120 in the bed 92 and at the bottom of the filter 90. A drain 122 is also provided. The configuration optimizes the upflow bead filter's ability to serve a dual action of particle filtration and nitrification filter.

The culture tank where the cultured organisms lives is self-cleaning. The floor of the tank 14 is modified so that it slopes (e.g., 2 inches/ft.) to the middle where a (e.g., 4 inch) trough 12 is located. The tank outlet is located at one end of the trough and collected wastes are removed to the particle filter. The concentration of waste in the trough and collected wastes are removed to the particle filter. The concentration of waste to in the trough is also facilitated through the use of bubble screens (aeration injectors) located directly above the drain. As a result, most of the wastes are flushed from the tank, requiring no labor.

Distributed Control Subsystem

An integrated process control system is utilized for the distributed control of the aquaculture production and filtration subsystems. The distributed control system (DCS) is composed of multiple sensors/transducers that convert environmental conditions into electrical signals, communication multiplexers that convert the sensor's electrical signals into digital code, computer hardware that can receive the transmitted signals from and to the multiplexers, computer hardware that interfaces to the human user and computer software configured to provide a graphical interface for representing floor plans, trending incoming data and trending historical data. In addition, high level integration of the control loops is managed by artificial intelligence computer programs (e.g., rule-based expert system, neural nets, fuzzy-logic-based expert systems, and neural fuzzy systems). Training set parameters include dissolved oxygen levels, salinity and conductivity, water level, pumping rates, pump effort, flow rates, temperature, heating and/or cooling effort, buffer addition based on pH, oxidation/reduction potential, seawater or water addition based on water level and salinity.

The DCS is used in conjunction With appropriate mathematical models (e.g., on/off, PID, statistical models or expert systems) for environmental monitoring and control in all culture and filter tanks (FIG. 11): (a) temperature monitoring and control; (b) pH monitoring and control; (c) salinity monitoring and control; (d) oxidation/reduction potential (ORP) monitoring and control; (e) dissolved carbon dioxide monitoring and control; (f) total dissolved gases monitoring and control; and (g) dissolved oxygen monitoring and control.

The DCS is used in conjunction with appropriate mathematical models (e.g., on/off, PID, statistical models or expert systems) to manage all filtration devices (FIG. 11). Sensor inputs (e.g., pressure, level, ORP and dissolved oxygen) are used to monitor the function of the filtration systems (e.g., particle, carbon, and biological). Based on the mathematical control models, outputs control various functions such as water flow or residence time, oackwashing and filter maintenance schedules.

All flow rates within and between filter components are monitored and controlled by the DCS. Changes in flow rates within and between filter components are performed by programmed machine intelligence and the DCS following evaluation of the water quality data, e.g., pH, dissolved oxygen, temperature, salinity (sea water systems only), ORP and turbidity.

The DCS is used for water level monitoring and control in all culture and filtration tanks used by the CACRAFS. Accurate control of water levels is necessary for flow rate stabilization in airlift-driven systems.

The DCS produces automated reports of critical systems functions and alarms (local and remote) when system parameters are out of setpoint. Alarms are both visual (strobe and message center) and audible (bell).

The DCS includes feed management capabilities with automated feeders as outputs and inputs from the machine vision subsystem and internal timers.

The DCS controls the photoperiod in all culture areas and is used to alter life cycles. The systems can turn lights on/off as well as control the level of lighting with rheostats.

Figure 9:
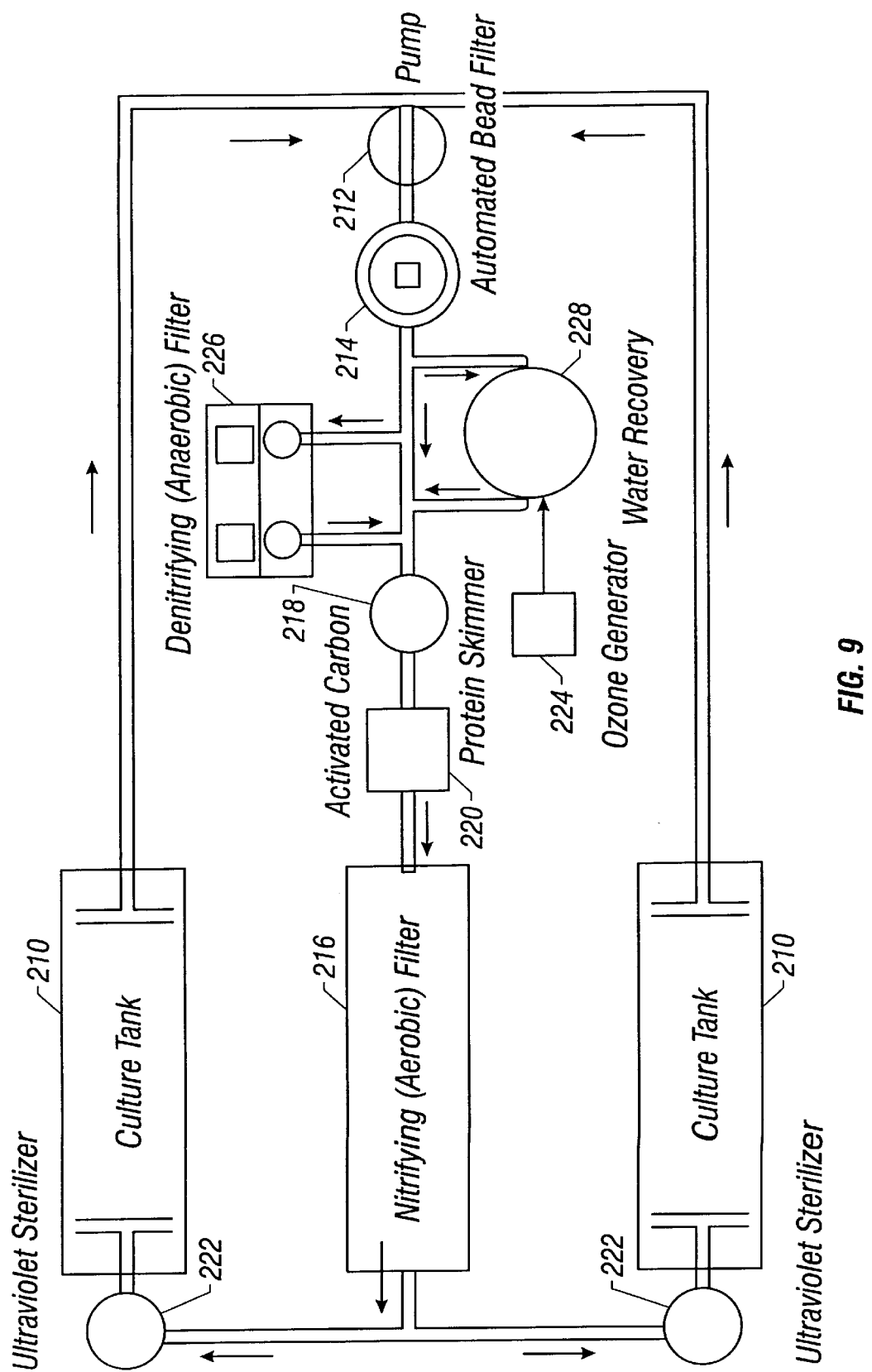
FIG. 9 depicts a closed aquaculture system including a culture tray, prefilter means, pumping means, automated aerobic biofilter, a source of UV light and connection between the various components.

FIG. 11 is a model for the function of a closed aquaculture system as shown in FIG. 1 or FIG. 9. The boxes are state variables. the spigots are transfer coefficients and the circles are effects. The model subsystem at the top is Animal Biomass 300. The state variable is grams of biomass 302. The effects are grams growth 304, growth in grams 306, number 308, weight in grams 310, kilos per cubic meter 312, tank volume I 314 and value $ 316.

The second model subsystem is cumulatives 340. The state variables are total feed kg 342, cumulative TAN (total ammonia nitrogen) 344 and biomass in grams 346. The effects are feed in kg 348, feed cost 350, Daily TAN gm 352, wasted feed 362, TAN biomass 354, nitrification 356, TNN biomass 358 and nitrification biomass 360.

The third model subsystem is total ammonia nitrogen 370. State variables include biomass gm 372, total ammonia nitrogen 374, bead filter 376 and sand filter 378. Effects are nitrogen content 380, feed rate 382, nitrogen feed gm day 384, assimilation rate 386, wasted feed 388, $NH_3$ mg I 390, NH, concentration gm I 392, Tank volume I 394, main flow rate 396, TAN to bead filter 398, bead filter nitrification 400, TAN to sand filter 402, Sand filter nitrification 404 and TAN return 406.

The fourth model subsystem is denitrification 420. State variables are TNN (total nitrate nitrogen) 422 and bioreactor 424. Effects are nitrification 426, bead filter nitrification 428, sand filter nitrification 430, $NO_3$ concentration mg I 432, $NO_3$ concentration gm I 434, tank volume I 436, TNN to bioreactor 438, denitrification 440, bioreactor efficiency 442, columns 444, bioreactor volume 446, bioreactor flow 448, residence time 450 and TNN return 452.

The mathematical model is as follows:

Animal Biomass

Biomass_gm(t)=Biomass_gm(t-dt)+(Growth_gm)*dt
    INIT Biomass_gm=Number*0.0020 {2 mg PLs}
    INFLOWS:
        Growth_gm=(Grams_Growth/7)*Number
    Kilos_per_cu_meter=B iomass_gm/Tank_Vol_I
    Number=154800 {400 animals/m3 @25gms & 10 kg/m3}
    Value_$=(Biomass_gm*2.2*6)/1000
    Weight_gm=Biomass_gm/Number
    Grams_Growth=GRAPH(time)
    (0.00, 0.25), (7.50, 0.26), (15.0, 0.26), (22.5, 0.278), (30.0, 0.312), (37.5, 0.407), (45.0, 0.54), (52.5, 0.915), (60.0. 1.11), (67.5, 1.18), (75.0, 1.20), (82.5, 1.20), (90.0, 1.20), (97.5, 1.20), (105, 1.20), (113, 1.20), (120, 1.20), (128, 1.20), (135, 1.20), (143, 1.20), (150, 1.20)

Cumulatives

Cum_TAN(t)=Cum_TAN(t-dt)+(Daily_T_A_N_gm) *dt
    INIT Cum_TAN=0
    INFLOWS:
        Daily_T_A_N_gm=Wasted_Feed
    Total_Feed_kg(t)=Total_Feed_kg(t-dt)+(Feed_kg)*dt
    INIT Total_Feed_kg=0
    INFLOWS:
        Feed_kg=((Feed_Rate/100)* Biomass_gm)/ 1000{kg}
    Feed_Cost_$=Total_Feed_kg*0.6
    Nitrification_biomass=(Nitrification/Biomass$_{gm}$)*1000

Denitrification

Bioreactor(t)=Bioreactor(t-dt)+(TNN_to_Bioreactor-Denitrification TNN_Return)*dt
    INIT Bioreactor=0
    INFLOWS:
        TNN_to_Bioreactor=TNN*(Bioreactor_Flow/ Tank_Vol_I)
    OUTFLOWS:
    Denitrification=Bioreactor_Efficiency*Bioreactor
    TIN_Retum=Bioreactor-Denitrification
    TNN(t)=TNN(t-dt)+(TNN_Return+Nitrification-TNN_ to_Bioreactor)*dt
    INIT TNN=0
    INFLOWS:
        TNN_Return=Bioreactor-Denitrification
        Nitrification=B F_Nitrification+SF_Nitrification
        OUTFLOWS:
        TNN_to_Bioreactor=TNN*(Bioreactor_Flow/Tank_ Vol_I)
    Bioreactor_Efficiency=0.7
    Bioreactor_Flow=Bioreactor_Volume* (24/Residence_ Time)
    Bioreactor_Volume=200*Columns
    Columns=6
    NO3_Conc_gm_I=TNN/Tank_Vol_I
    Residence_Time=2 { 2 hours, converted to days}

Total Ammonia Nitrogen

Bead_Filter(t)=Bead_Filter(t-dt)+(TAN_to_BF-TAN_to_SF-BF_Nitrification)*dt
    INIT Bead_Filter=0
    INFLOWS:
        TAN_to_BF=NH3_Conc_gm_I*Main_Flow_ Rate OUTFLOWS:
        TAN_to_SF=Bead_Filter-BF_Nitrification
        BF_Nitrification=min(Bead_Filter,250)
    Sand_Filter(t)=Sand_Filter(t-dt)+(TAN_to_SF-TAN_ return-SF_Nitrification)*dt
    INIT Sand_Filter=0
    INFLOWS:
        TAN-to_SF=Bead_Filter-BF_Nitrification
    OUTFLOWS:
        TAN-Return=Sand_Filter-SF_Nitrification
        SF_Nitrification=min(Sand_Filter,3750)
    T_A_N(t)=T_A_N_(t-dt)+(Wasted_Feed+TAN_ Return-TAN_to_BF)*dt
    INIT T_A_N=0
    INFLOWS:
        Wasted_Feed=Nitrogen_Feed_day-(Nitrogen_ Feed_gm_gm_day* Assimilation_Rate)
        TAN_return=Sand_Filter-SF_Nitrification
    OUTFLOWS:
        TAN_to_BF=NH3_Conc_gm_I*Main Flow_Rate
    Assimilation_Rate=0.45
    Feed_Rate=Grams_Growth*1.8
    Main_Flow_Rate=(890*3.785)*3600
    NH3_Conc_gm_I=T_A_N/Tank_Vol_I
    NH3_mg_I=NH3_Conc_gm_I*1000
    Nitrogen_Content=0.4
    Nitrogen_Feed_gm_day=Biomass_gm*(Feed_Rate/ 100)* Nitrogen_Content
    Tank_Vol_I=387374

Not in a sector

TAN_Biomass=Daily_T_A_N_gm/Biomass_gm
    TNN_Biomass=(Nitrification/Biomass_gm)*1000

Machine Vision Subsystem

The application of an adaptive neurofuzzy inference system (ANFIS) is used for the purpose of object classification in order to develop an object recognition model for a machine vision system. Automated image quality assessment using image quality factors (overall brightness, kurtosis features of the curve describing contrast), expert knowledge (an estimate of animal size, an estimate of thresholding values necessary to segment an animal), a model of the image quality as it relates to the ability of the machine vision system to accurately measure objects. and a model of image quality as it relates to the certainty of measurement are developed using ANFIS. Texture based image modeling uses an adaptation of the Markov random fields metlhods. Image modeling based on Markov random fields is well known. The present invention uses an adaptation of this method involving the addition of motion information and the use of a predictive fuzzy model of image information to determine the likelihood of a neighborhood of pixels being the target object.

Figure 16:
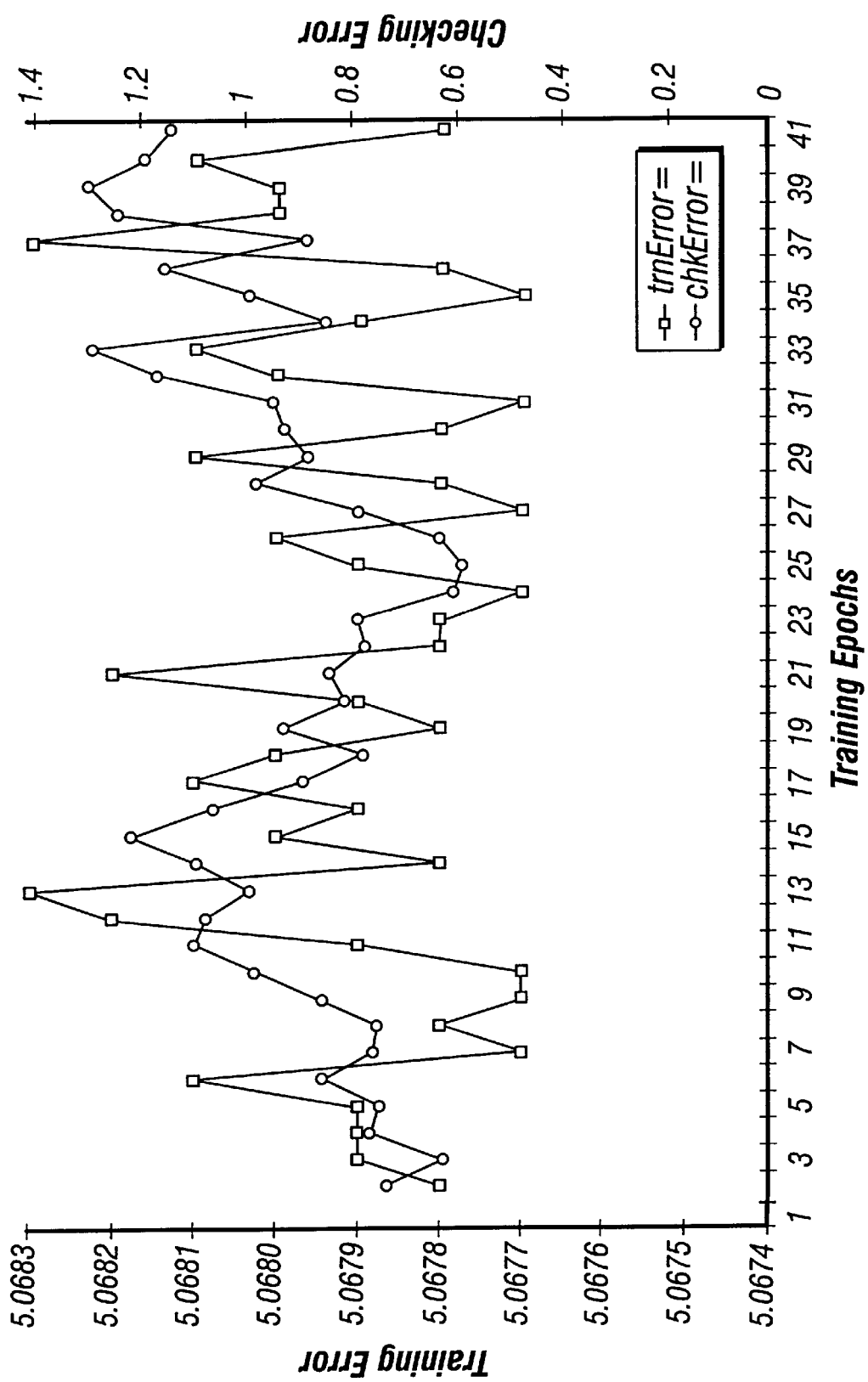
FIG. 16 depicts the error involved in training a traditional machine vision system. The squares indicate training error and the circles indicate checking error.
Figure 17:
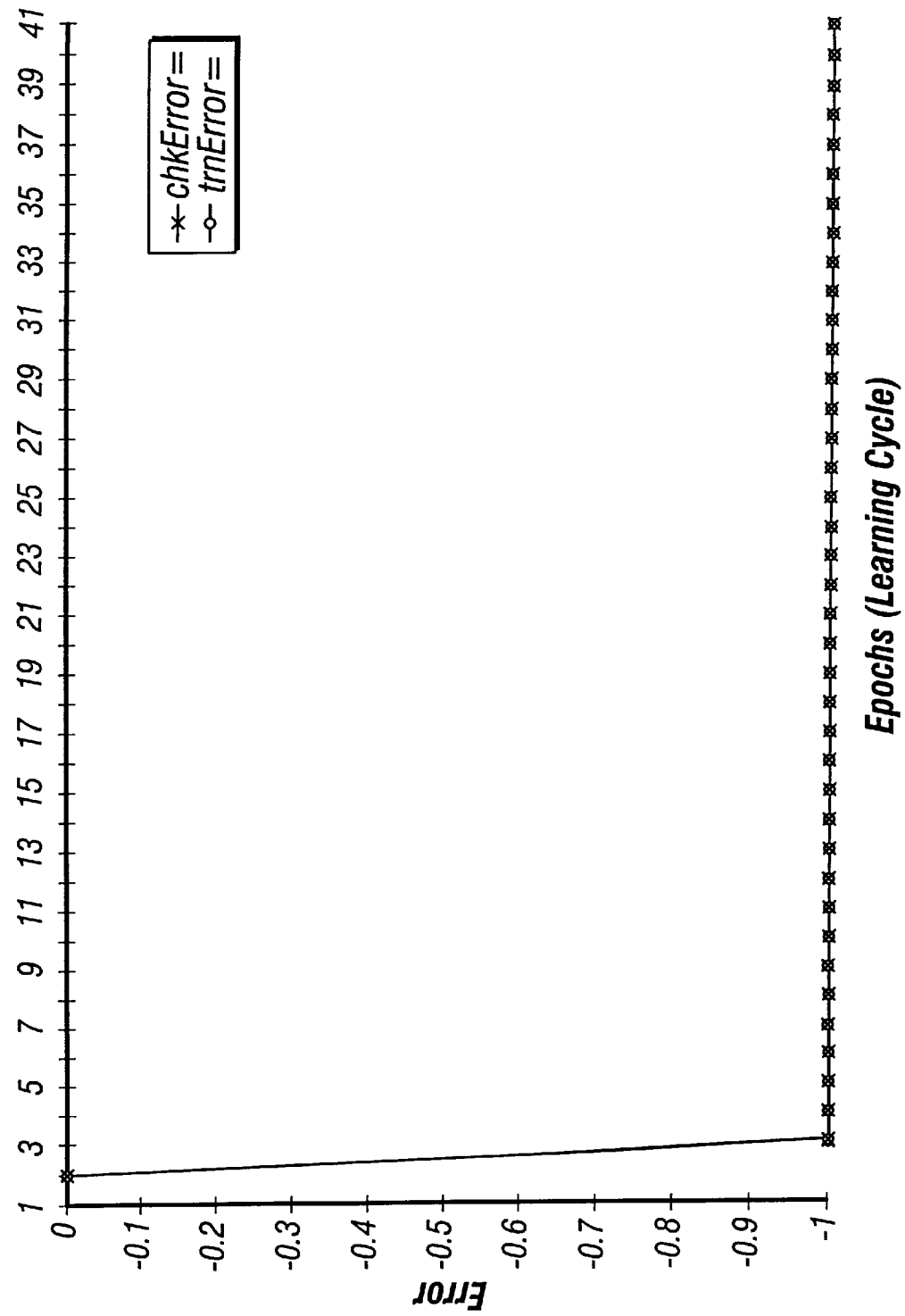
FIG. 17 depicts the error involved in training the ANFIS machine vision system. The X indicate checking error and the circles indicate training error.

A part of the present invention is the application of ANFIS for the purpose of system state classification for the purposes of developing a system state recognition model for an automated aquaculture system. Rapid object modeling: Using the input of the traditional image analysis tools such as Global Lab Image (FIG. 15), the use of ANFIS under the batch learning mode allows for the rapid development of a FIS that models the target object (FIG. 16 and 17). The unique step taken here to rapidly model an object is the use of "natural" groupings from the world of fuzzy logic.

Figure 12:
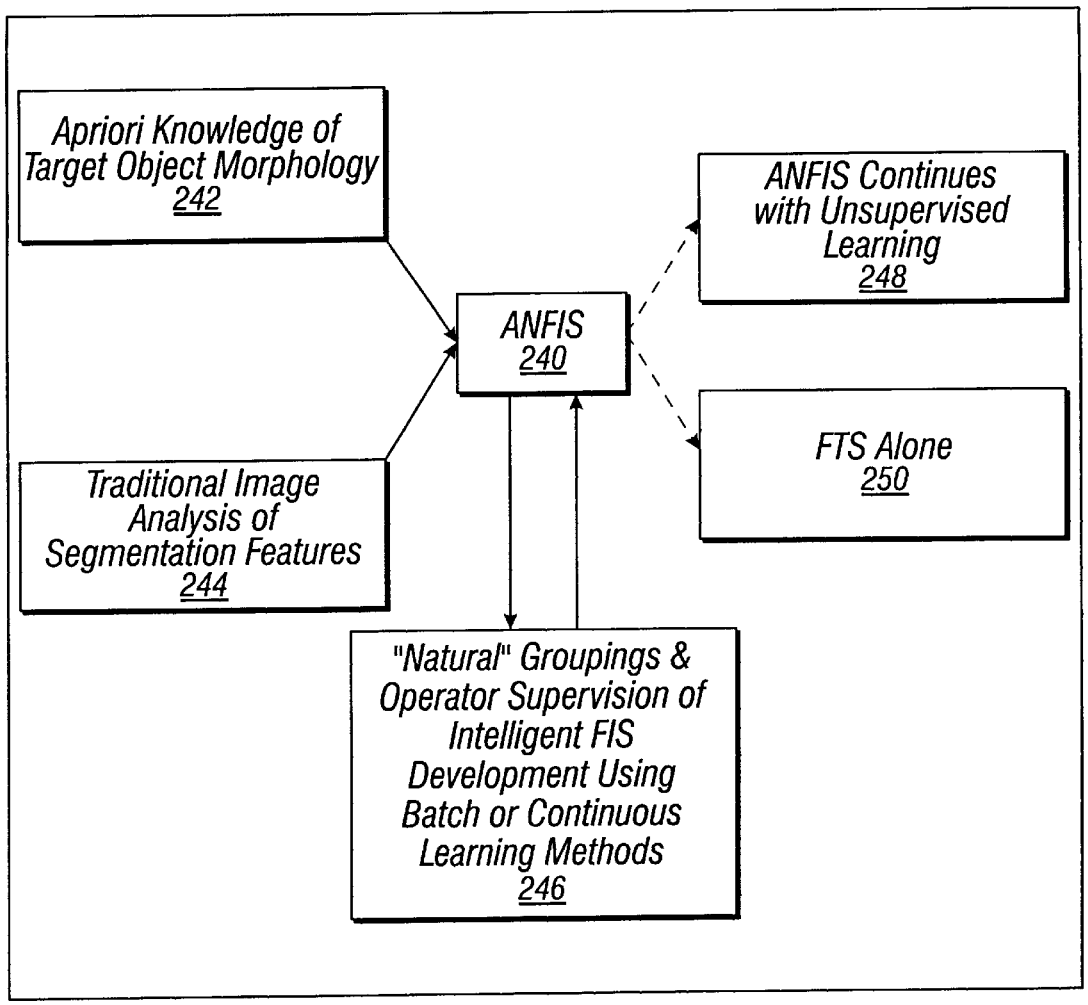
FIG. 12 depicts an adaptive network based fuzzy inference driven machine vision classification system for aquaculture in block diagram form.

Another aspect of the invention is the use of machine learning (batch or unsupervised) to monitor the condition of organisms in an automated aquaculture system. This includes organism condition assessment, in which the condition of the organism may be (1) defined using a pre-existing knowledge base and/or (2) deduced based on the ANFIS process of combining target object feature analysis with other parameter data (such as water quality, temperature, light level) in an automated aquaculture system. Continuous organism activity monitoring in which the activity level of the animals, based on gross movement and shape recognition is incorporated into the automated aquaculture system is also used. A diagram of the Adoptive-Network-based-Fuzzy Inference Driven Machine Vision Classification System for Aquaculture (ANFIS) is shown in FIG. 12. The inputs to the "ANFIS" 240 include "a priori knowledge of target object morphology" 242 and "traditional image analysis of segmentation features" 244. The input/output loop in FIG. 12 is "natural groupings and operator supervision of intelligent FIS development using batch or continuous learning methods" 246 and the outputs are "ANFIS continues with unsupervised learning" 248 and "FIS alone" 250.

An aspect of the invention, therefore, may be described as the use of the results of machine vision as sensor input (i.e., control variable) in an automated aquaculture system.

The Airlift

Figure 3:
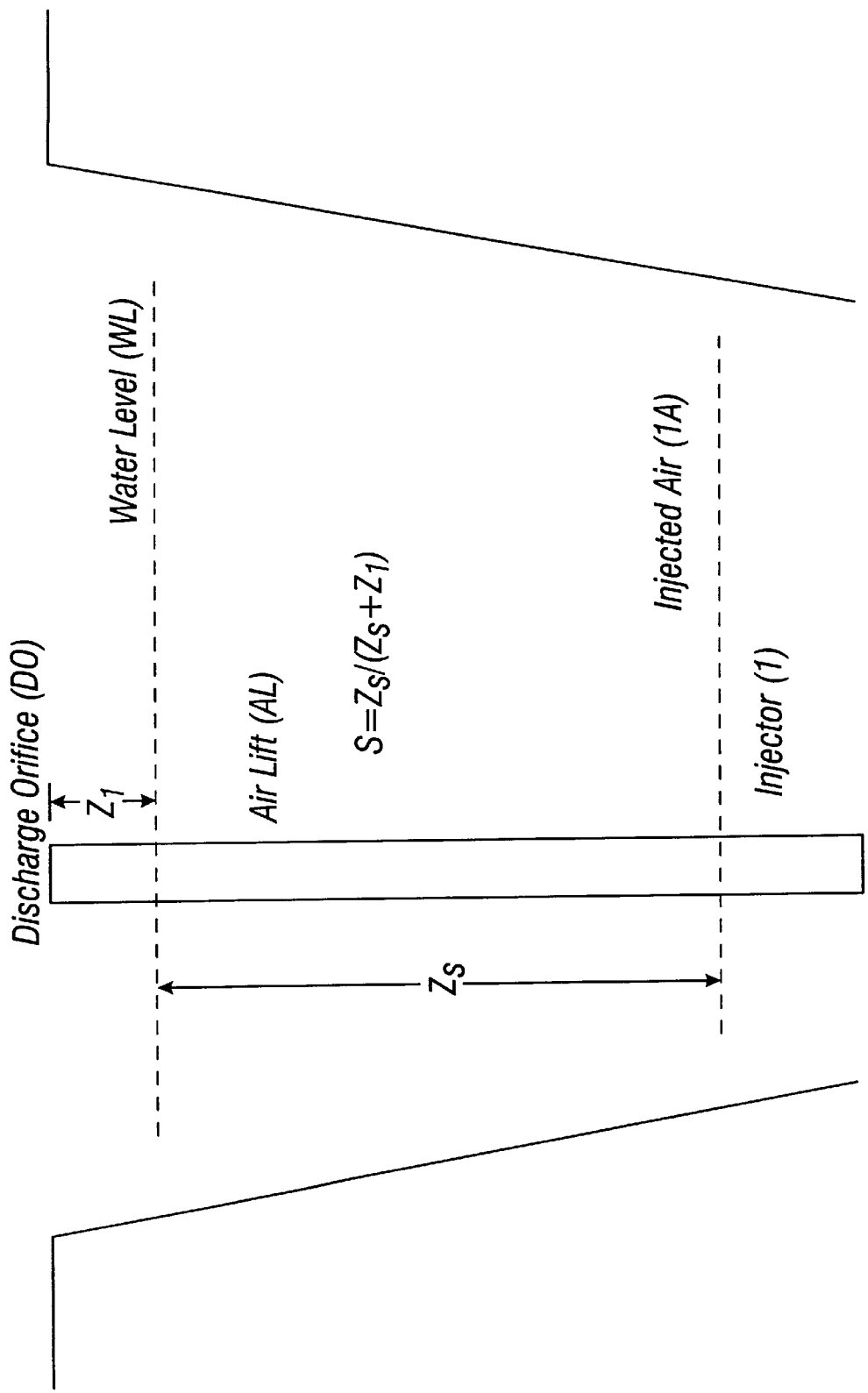
FIG. 3 depicts an example of submergence (S). The top of the vertical Air Lift (AL) is the discharge orifice (DO). The top dashed line is the water level (WL). The bottom dashed line is the injected air (IA). At the bottom of the air lift is the injector (I). The distance from WL to DO is $Z_1$. The distance from WL to IA is $Z_S$. The formula for submergence is $S=Z_S/(Z_S+Z_1)$.

Key elements in the economical use of this type of water circulation are: (1) submergence (FIG. 3) or the relationship (expressed as a percent) between the depth air is injected to the height water is raised (lifted); (2) the volume of injected air, FIG. 3; (3) the design of the injector, 1; (4) diameter of the airlift; and (5) the design of the lifted water discharge orifice DO, and head tank. The most efficient airlifts deliver water through an open vertical pipe at the water's surface. Efficiency declines as the top of the pipe is raised above the surface. Theoretically, a submergence below 80% results in very restricted water flow volumes. Pipe diameter influences the height of lift and smaller pipe diameters are more efficient at lower (below 80%) submergences. Air bubble size configuration influences airlift efficiency. Small bubbles rise slower and lift water at a slower rate than large bubbles. Uniform bubble size moves less water than mixed bubble sizes. Two types of injection are commonly used. One type injects air through a collar outside the airlift pipe and the other injects air through a pipe installed inside the airlift pipe. The first design avoids restricting water flow by limiting friction and optimizing the volume in the pipe.

The novel airlift pump included in this invention has several unique design characteristics. First, the diffuser orifice 53 is a modified tear drop shape (FIG. 4) beginning as a slit at the top to produce smaller (<1–10 mm dia.), slower rising bubbles then expanding to a circular base to produce larger bubbles (10–30 mm dia.) (FIG. 4). This produces mixed bubble sizes and broadens the range of control for automation. Three diffuser orifices are cut into smaller diameter pipe (½–2"). The numbers of orifices increase with pipe circumference to the maximum number that can be evenly spaced leaving enough material between the greatest horizontal diameter of the orifices to firmly connect the lower end of the diffuser. Second, for ease of access to the diffuser, all airlifts used in this invention are engineered with larger lift tubes 55 so an air pipe with the diffuser attached can be installed in the center of the lift tube. Third, the air-water slurry exiting the top of the airlift pipe is deflected away from the top of the pipe by a cone-shaped structure. If the top of the airlift were at the surface of water in a tank the cone would reduce lift efficiency. However, water must be raised some amount (~10–20 cm) to provide head pressure for circulation through filters. Therefore, the airlift must empty into a head tank. Several centimeters of the top must extend above the bottom of the head tank so that water does not try to flow back down the airlift before it exits the head tank. Thus, the cone-shaped structure deflects water away from the top of the airlift so that it does not fall straight down and impede water flow. The airlift and head tank can be installed anywhere in the loop. In the interest of safety, it should be down stream from the filter that plugs the easiest (i.e., particle filters; FIG. 1).

Water circulation through the system is a closed loop through the culture tank(s) and individual filters, e.g., FIG. 1. The portion of the total flow that moves through each subsequent component is adjusted using by-pass loops between components and allows control of the efficiency of filtration, the deployment of expendables and the rate of water circulation (~50–200 gpm). The degree of filtration efficiency must maintain water quality at an acceptable level and may be adjusted by variable-rate recirculating loops within each component, e.g., the foam fractionator. All of flow rates within and between components are monitored and controlled by the distributed control system (DCS).

Particulate Removal

Particulate removal may be accomplished by screens, settling basins, media filled traps and to some extent, physical/chemical adsorption devices (e.g., foam fractionators and activated carbon). With the exception of canister type particle traps, most solids removers can be directly plumbed into an airlift driven water circuit. The most practical designs for airlifts have large surface areas, moving screens and/or sediment traps. The cross sectional design (FIG. 2A) of the culture tank can be such that solid wastes are massed in the flow of water circulation and carried to a solids trap 20. This effect is dependent upon a tank design that is longer than wide and configured with the water inlet at one end and the outlet at the other. Air diffused into the culture tank along the longitudinal axis creates circulation cells at right angles to the longitudinal flow of water and flushes solids particles from the bottom and sides to the center. Solids then migrate with the water flow from the inlet end of the tank to the outlet where they are picked up in the outlet stream and carried to the solids separator 20. Solids separators should be installed immediately downstream from the culture tank. The inlet to the separator should empty at the height of the water level in the culture tank so that the culture tank water level stays constant. Alternatively, a low head pressure upflow bead filter (FIG. 7) or sand filter can be used to separate particles. These latter two systems require backwashing with the loss of a fraction of system water.

Physical Adsorption

Foam fractionators of all designs can be included but their position should be fixed. They should be positioned immediately after the particulate filter. The primary design constraint is that water flows down the fractionator column against a countercurrent of air bubbles. Dissolved and suspended organics adhere to the bubbles and are carried up a drying tube above the water level. It is transferred from the bubbles to the sides of the drying tube and carried up to a reservoir by the air stream that produced the bubbles.

The foam fractionator designed for the system described in the specific embodiments (FIG. 5) consists of a cylindrical (contact) chamber 32 standing on end and plumbed to an airlift near its bottom. The bottom of the cylinder is closed and the top is fitted with a shallow cone 34 pointed upward. The cone location is adjustable in the cylinder and its base is set at cylinder water level. Void volume decreases toward the top of the cone condensing foam as it is produced and floats upward. The peak of the cone opens into a section of tubing 36 that further condenses or "drys" the foam that is carried by the stream of escaping air to a foam collector. In this embodiment the top of the drying tube is fitted with a venturi 44 that assists escaping air to carry the foam to a reservoir outside the system.

Untreated water enters the foam fractionator contact chamber through louvered slots 31 positioned several centimeters below the water level of the vessel holding the fractionator (FIG. 5). The water is drawn in by an airlift 55 plumbed to the bottom of the contact chamber and the flow rate is adjusted to optimize the formation of foam in the condensing cone. The louver fins are directed inward so that water entering the contact chamber travels in a circular pattern. This design: (1) increases water residence time for more efficient organic removal, (2) allows small air bubbles to coalesce into to larger bubbles that can rise faster against the countercurrent of water, and (3) concentrates the bubble mass in the center of the cylinder so that it does not escape through the louvers. The rate at which water can be stripped of dissolved and particulate organics is dependent upon a water velocity through the contact chamber that allows air bubbles carrying the organics to rise. Therefore, the diameter of contact chamber is an important factor because as it increases, the distance traveled in each complete circle increases and the volume of water that can be stripped increases.

Chemical Adsorption

Activated carbon, zeolites, synthetic media and selectively permeable membranes are used to trap molecules based on size or electrical charge. Filter designs for these media all produce a water flow directed across the media. A typical embodiment for this invention is a vessel fitted with a false bottom and screen such that water enters the vessel below the false bottom and flows upward through the screen and media. The screen must be of a mesh size that retains the media but passes the largest particles that escape the particulate filter. Designs that hold media in a vertical configuration against the water flow in a high pressure, pump-driven system tend to become compacted and require more labor to operate.

Biological

Media beds support bacteria for (1) oxidizing organic wastes to $NH_4$ and $CO_2$, and (2) reducing the end product(s) to elemental nitrogen, $N_2$. Oxidizing beds probably have the greatest variety of designs, media types and operating efficiencies of all the filters and conditioning devices used in aquaculture. The most common type is the submerged filter (e.g., under gravel or sand). Wet-dry filters pump water over plastic balls, synthetic and natural fiber mats and other surfaces that are exposed to the air. Fluidized beds use fine grained particles (e.g., sand or plastic beads) that are kept in suspension by the flow of water injected beneath them. All types have been adapted to function at head pressures produced by airlifts.

The design used in this embodiment of the invention is a modified submerged bed. However, the design of the bed differs from typical submerged beds in several key characteristics. First the bed is elevated so that it is just submerged at the surface 64 and incoming (untreated) water is injected below the bed 61 and rises through it (FIG. 6). This configuration: (1) reduces compaction of the bed and subsequent reduction of flow; (w) forces organic laden water to contact the dark side of the bed thus limiting the growth of heterotrophs; and (3) causes the bottom of the bed to contact oxygen rich water thus preventing the development of anaerobic regions in the bed. Second, this elevated configuration allows the area under the bed to be cleaned by extending a siphon through a manway 66. This saves down time and man hours normally spent dismantling the filter bed. In situ monitoring of filter bed function is accomplished with dissolved oxygen and pH probes above and below the bed and four oxidation-reduction probes spaced evenly over the filter bed surface area and inserted halfway into the depth of the filter bed. These inputs will be used to control water flow through the filter bed and injection of air or oxygen and buffer into the filter tank. This will optimize filter bed chemoauxotophic bacterial metabolism.

An alternative nitrifying biofilter is the upflow plastic bead filter (FIG. 7) that functions as a physical filter as well as a biological filter. This filter can perform both functions quite well when operated optimally in contrast to submerged filters that are adversely affected by particulate accumulation (e.g., channelization and biofloc mineralization). An upflow bead filter can accumulate particulates and nitrify when backwashed appropriately. However, optimizing these upflow bead filters requires an expertise that is often lacking in the personnel operating them. For this reason, automation of their function is essential. The operation of the upflow bead filter can be optimized by monitoring bacterial metabolism in the bed using in situ sensors (e.g. dissolved oxygen 112, oxidation-reduction potential 120, pH 118 and flow rate 116) and measuring the pressure drop across the bed due to particulate accumulation with pressure sensors 114. This embodiment has two oxidation-reduction sensors 120 to be placed below and above the bed as well as two more being placed within the bed at 180° intervals around the circular bed 92. In addition two pH sensors 118 are placed in the opposite 180° configuration. These four sensors are placed in the middle of the bed height. In addition, one dissolved oxygen probe 112 is placed above and one below the bed. The differential pressure transducer 14 is connected to the filter influent 130 and effluent 132 piping. The inputs from the sensors is used to automate the water flow rate or residence time, backwash frequency, backwash duration and to inject oxygen and buffer into the bead filter to optimize the growth and metabolism of the chemoauxotrophic bacteria and inhibit the heterotrophic bacteria residing on the beads. If backwashing is too frequent or severe, the chemoauxotrophs will not be able to maintain their position on the beds and they will be removed from the filter at backwashing. If the backwashing is not frequent enough, the heterotrophic bacteria will overgrow the chemoauxotrophs and the filter will actual produce ammonia and other waste products instead of removing them. It is this fine balance that requires automation.

Another example of automated biological filtration is an automated denitrifying bioreactor described in U.S. Pat. No. 5,482,630. This filter makes it possible to remove the nitrogen from the water completely. It is essential to the design of a truly closed aquaculture system and is included as a component of the automated, closed recirculating aquaculture system as described herein.

Sterilization by Oxidation/Irradiation

This group of devices produce ozone, ultraviolet light (UV) or both for the purpose of sterilization. Ozone is highly corrosive. It is most safely used by injecting it into the water processing loop at a point where dissolved organics are most concentrated to facilitate its reduction. Ozone delivery systems can be used in closed aquaculture systems without modification. The efficiency of and responsible use of Ultraviolet (UV) light requires a design that insures that all water passing through the contactor pass over a specified section of the bulb and within a specified distance from the bulb at the specified section, i.e, a lethal contact zone. Less contact could result in the formation of UV resistant strains of bacteria. Economical UV contactor designs for pump-driven systems can not pass enough volume to be effective on airlift driven systems. At head pressures of 15–30 centimeters 1 properly configured UV bulb is needed for each 60 liters of water circulated per minute. Therefore, UV contractors for airlift systems were designed with (1) larger inlet and outlets; (2) more bulbs, and (3) air purge vents. Installation of the UV contactors in line between the last filter and the culture tank and below the water level of each minimizes flow restrictions imposed by low head pressures.

Distributed Control System

The distributed control subsystem is composed of the following elements. An industrial process control system was designed and installed on the above described tank system. The original design was based on a microcomputer supervisory control and data acquisition system (SCADA), linking 386/486 series personal computers (PC) with standard industrial control signal multiplexers and software. Currently, the system has become a subprocess in a more comprehensive distributed control system (DCS) that serves three separate aquaculture facilities. Every component (hardware and software) was bought off-the-shelf so that no circuits were constructed and no computer code was written.

The software used is an intuitive graphical interface product for Windows™ operating environment, DMACS™ for Windows™ by Intellution. The program can run on any 386/486 PC and includes Net DDE, allowing transfer of data between Windows™ programs. Inputs and outputs can be displayed as floor plans, graphs, charts or spreadsheets in real-time and all data can be archived to the hard disk or other media. Control functions include: set point control, PID (proportional/integral/derivative) control, batch control, statistical process control and custom control blocks. Additional modules allow networking across typical microcomputer networks and remote operation from a dial-in phone line. The computer hardware was a 486 IBM clone PC with 16 MB (Megabyte) RAM (Random Access Memory), 250 MB hard-disk, 1 MB video card and a SVGA Monitor. A Best Systems (Model 660) uninterruptable power supply (UPS) protected the computer from power surges and would power the computer and monitor for 35 min. during a power outage.

The computer software and hardware was interfaced to an unintelligent signal multiplexer network (Dutec Model IOP-AD+ and IOP-DE) composed of 16 analog and 16 digital inputs/outputs (I/O) channels. Each channel required its own signal conditioning module that could accept any voltage or current signal (i.e., 4–20 mA, 0–1 V or 0–100 mV). Many different types of I/O were connected to the multiplexer. The raceway control system included monitoring and control of temperature (i.e., chiller and heaters), pH, salinity (conductivity), dissolved oxygen, water flow rate between tank and filter and water level. In addition, photoperiod control (i.e., relay for overhead lights) and an automatic belt feeder were installed. The raceway multiplexer was one of four such multiplexers connected to the control system. The raceway system was represented on the control system's video monitor as a top view and all major functions (i.e., photoperiod, ultraviolet sterilizer state, water level, pH buffer injection and protein skimmer state) were animated for easy visual determination by the technical staff. Digital displays similar to meter displays were created for temperature, dissolved oxygen, pH, salinity and water flow rate; all inputs and most outputs were archived to a historical data base on the computer hard disk.

Figure 13A:
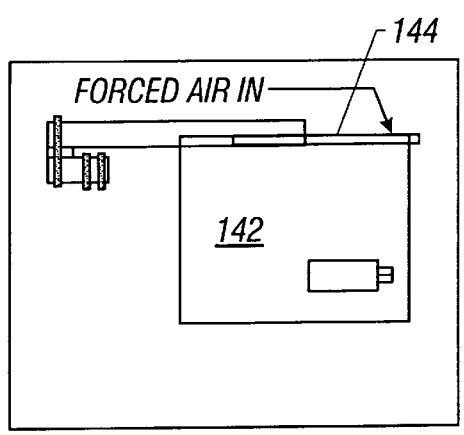
FIG. 13A–FIG. 13D depicts imaging equipment for the machine vision subsystem of the present invention.
Figure 13B:
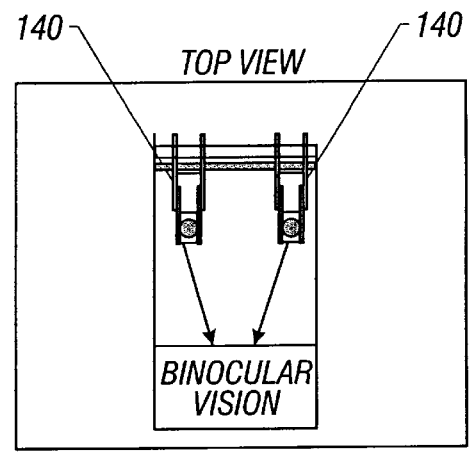

Imaging Equipment (a) An embodiment of the invention as described herein utilizes two black and white security cameras 140 (Burhel), a standard RS170 video output or two digital cameras consisting of a 1"×1" digital circuit board on which a video camera is mounted and the fixed focus lens they utilize (FIG. 13B). The output of these cameras is a standard RS170, although with fewer lines of resolution than the other cameras. The housing for these cameras will consist of a small plastic dome housing (4 inches in diameter) fixed and sealed (via a silicone greased o-ring) to a plexi backing.

(b) Each camera is contained in a glass housing comprising a 6"×16"×20" open-top, rectanguloid shape similar to a small aquarium 142 (FIG. 13A). Each housing is topped with a plexiglass lid 144. The lid has two openings, one for the cords 146 (power in. video out). the other for the forced air entry. Forced air is an integral part of the housing. It allows the electronic equipment to operate successfully in a seawater environment. The use of forced air for this purpose is believed to be a novel aspect of the invention.

Figure 13C:
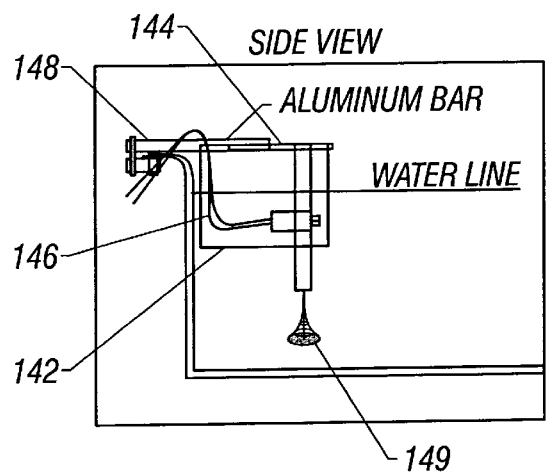

(c) The camera housing is mounted on each tank by an aluminum bar 148 (FIG. 13C) referred to as the "camera mount". The main arms of the camera mount consist of solid bar aluminum, and the cross pieces are manufactured from aluminum angle iron. Solid aluminum bar was used for three reasons: (1) to maintain a rigid lever arm, (2) aluminum will not corrode dangerously with contact with sea water, and (3) the weight of the solid bar helps to compensate for the buoyancy of the housing in salt water. The angle of the mount is adjusted by four bolts which are in contact with the underside of the tanks lids.

Figure 13D:
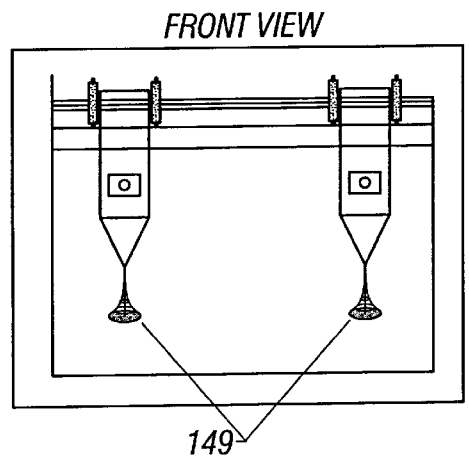

(d) An additional weight, in the form of a plastic and epoxy coated boat anchor 149 (FIG. 13D), is used to compensate for the buoyant force of the housing. Compensating for buoyancy and thus reducing the effect of wave action is a necessary part of coping with submerged or partially submerged cameras.

Image Digitization and Processing

Figure 14:
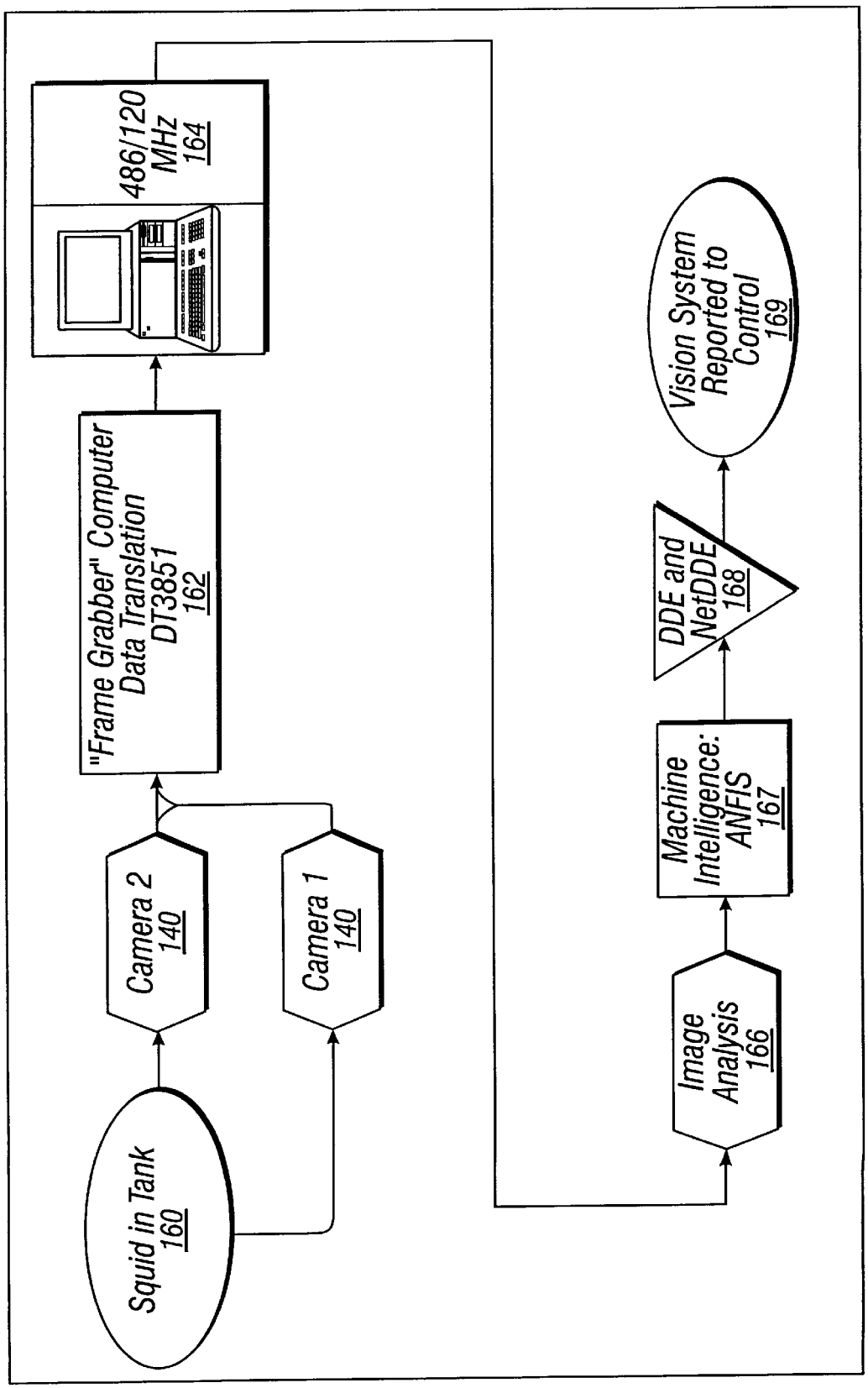
FIG. 14 depicts image digitization and processing for the machine vision subsystem of the present invention.

The image digitization and processing system is illustrated in FIG. 14. The squid or other animals in the tank 160 are visualized by two cameras 140, which are connected via RS232 cable and connectors to a Data Translation "Frame Grabbing" Board (model #DT3851) 162. This board is responsible for image digitization and some low level frame processing. The advantages of this board are that the on-board memory may be programmed and operations such as frame subtraction, may take place on the board itself, thus speeding the overall frame processing time. The Data Translation board is mounted in the Machine Vision Computer 164, which also contains an Intel 486/120 MHz motherboard and 16 Mb of RAM. The computer produces an image analysis 166, which is subject to the machine intelligence ANFIS process 167, combining target object feature analysis with other parameter data, and processed through Dynamic Data Exchange (DDE) connections and NetDDE 168 to link the various software packages and report 169 the vision system results to control.

Software

For the development of the systems described herein standard, consumer level versions of the following software were used (FIG. 15):

(a) Global Lab Image 182: for image feature extraction, image enhancement, data collection and the beginning stages of the inventors' statistical recognition model.

(b) Matlab 196 & Matlab's Fuzzy Logic Tool Box 200: for producing a working fuzzy model as well as the first attempts at using ANFIS, and the beginnings of the Dynamic Data Exchange (DDE) connections the inventors used to link the various software packages to produce a working model of their system.

(c) Microsoft Excel: for DDE linkage as well as data storage and manipulation in the beginning stages of the work.

For the development of the final system, the inventors used the following software libraries and programs:

(d) GLIDE 184: the developer's library containing the source code and all the related functions of the Consumes version of Global Lab Image.

(e) Matlab 196: the consumer version of this product contains resources to port Matlab script files to C compilable units.

(f) Borland C++ compiler v. 4.0 186: The inventors made limited use of this compiler and development platform in order to port the Matlab generated C units to Dynamically Linked Libraries (DLL's) that could be used by the Object-Oriented Application generated using the Delphi Application Development Program.

(g) Borland Delphi 190: Delphi is an Object-Oriented, Pascal-based Development Platform. Using it allowed the generation of a unique application 188 using the programming libraries listed above and the user interface provided by Delphi. Delphi also includes a powerful library of DDE, Net DDE and Object Linking and Embedding (OLE) objects (or functions). These were essential to the final development of the machine vision system which is linked across the computer network with the overall control system which uses FixDMACS software.

Figure 15:
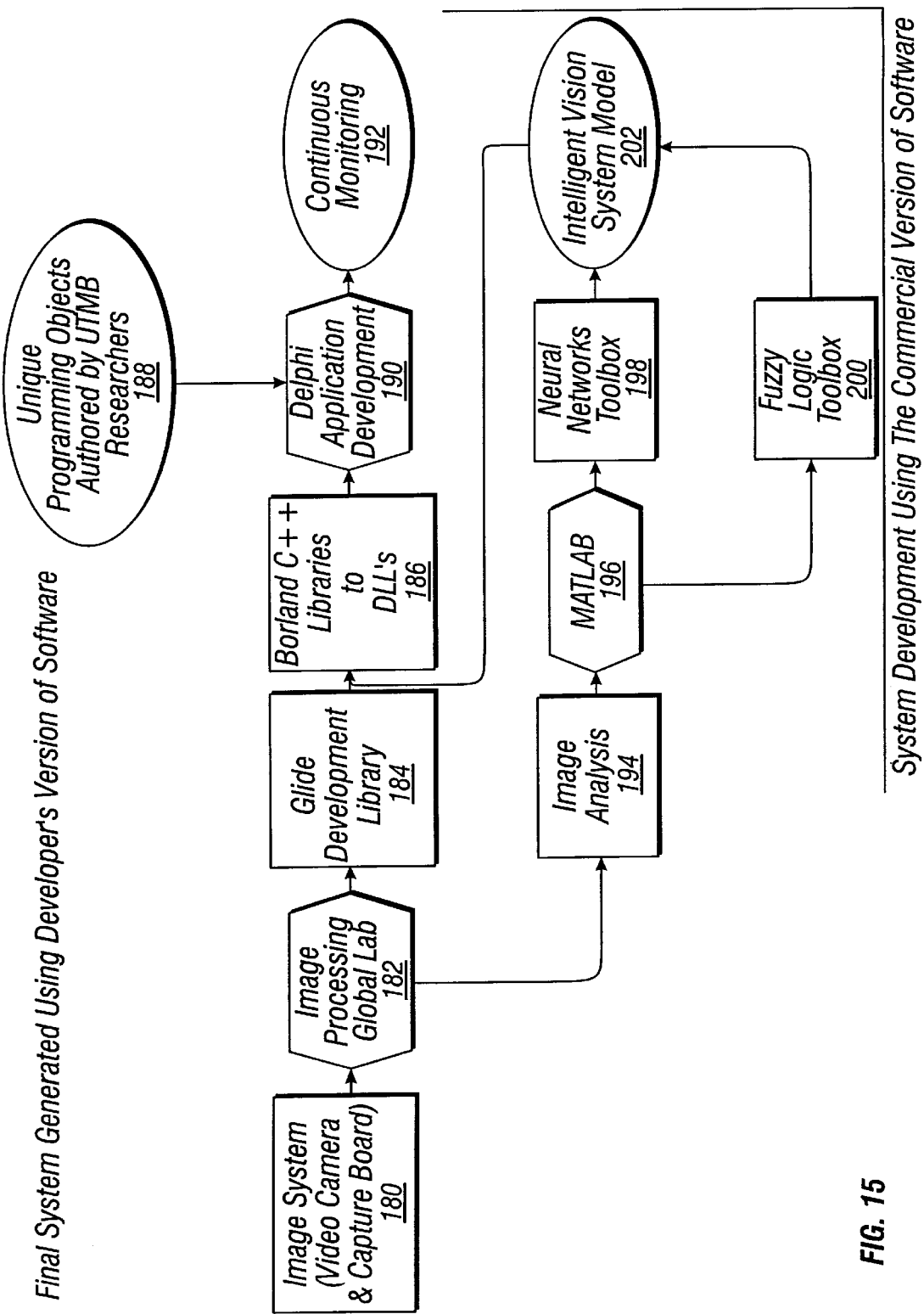
FIG. 15 depicts in block by block diagram the software use and development for the machine vision subsystem of the present invention.

The final system generated using the developer's version of the described software, as shown in FIG. 15 includes the following:

The imaging system (video camera and capture board) 180 connects to the image processing global lab 182 software that produces image analysis 194, which feeds into MATLAB 196 using the neural networks toolbox 198 or the fuzzy logic toolbox 200 to produce the intelligent vision system model 202. Alternatively the image processing global lab 182 connects with the glide development library 184, and further utilizing the Borland C++ libraries to DLL's 186, and using the Delphi application development software 188 unique programming objects are authored 188 to result in continuous monitoring 192.

EXAMPLE 1

A 14,500 liter (3,756 US gal.) system used to culture a sensitive marine species *Sepioteuthis lessoniana* (squid) was fully automated and connected to an automated denitrifying bioreactor. Airlift technology was developed in 3 other system designs the largest of which consists of 2 culture tanks, 2 particle filters, 2 foam fractionators, 2 carbon filters, 1 biological filter and 2 UV sterilizers. The total volume of the system including plumbing and prefilter tanks totals 53,150 liters (16,360 gal.). All systems supported the squid (*Sepioteuthis lessoniana*) through its life cycle. The automated system maintained squid through 6 generations. Airlift-driven systems are in operation with all filtration and water conditioning devices for low-head pressure application (designed, built, tested and proven). One embodiment (a nursery system) has supported *Sepioteuthis lessoniana* (squid species) from incubation to late juvenile stage and another (grow-out) system supported it to the end of its life cycle, including the production of fertile eggs. The system maintained adequate water quality (FIG. 8A–8D) as six generations of squid were grown in the system. Another embodiment has *Sepia officinalis* (cuttlefish species) nearing sexual maturity in its inaugural culture run. In addition to the squid and cuttlefish production systems described above, this invention is applicable to the culture of marine fish and fingerlings.

EXAMPLE 2

Figure 10A:
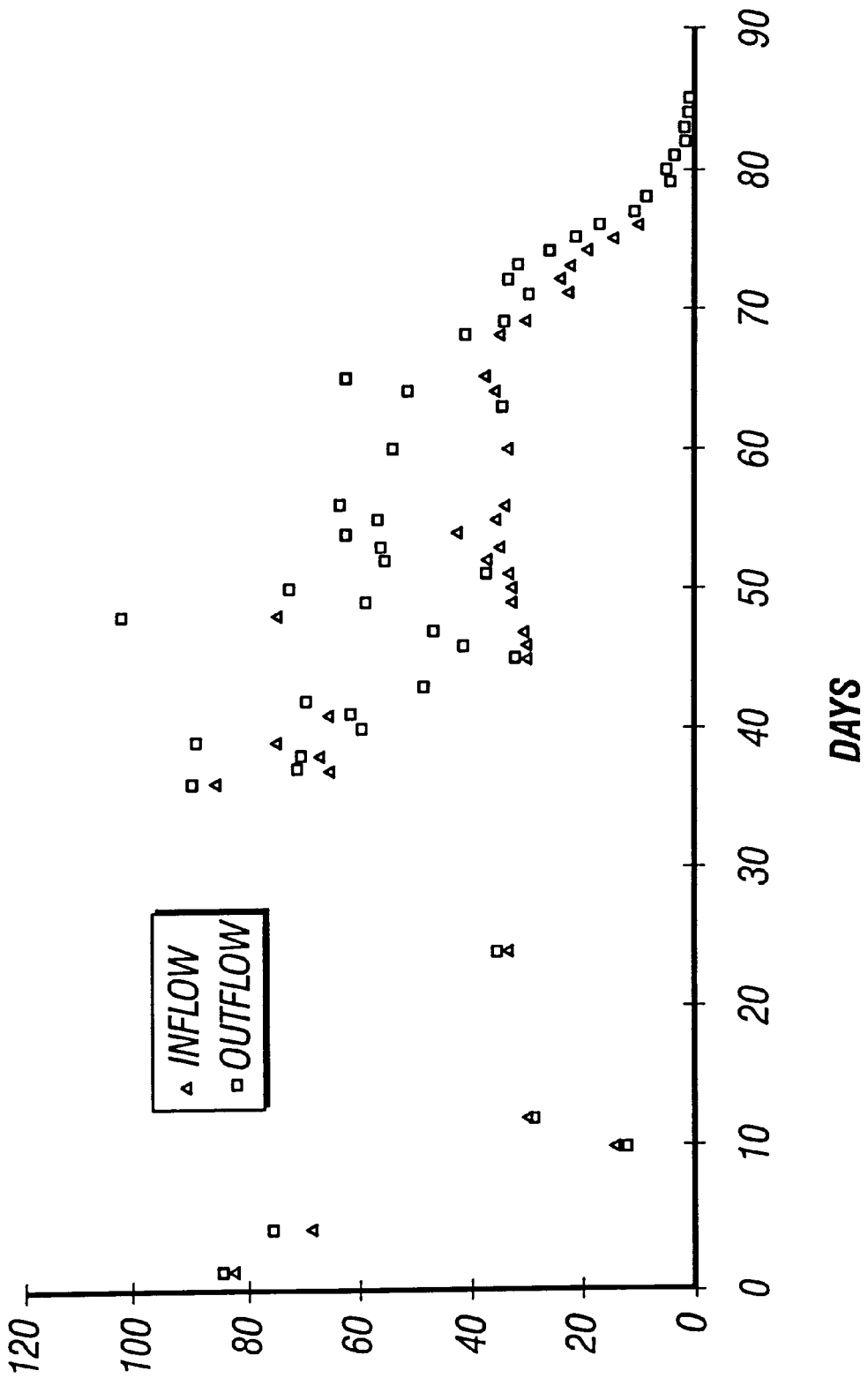
FIG. 10A–FIG. 10C depict the water quality history from the system of FIG. 9.
Figure 10B:
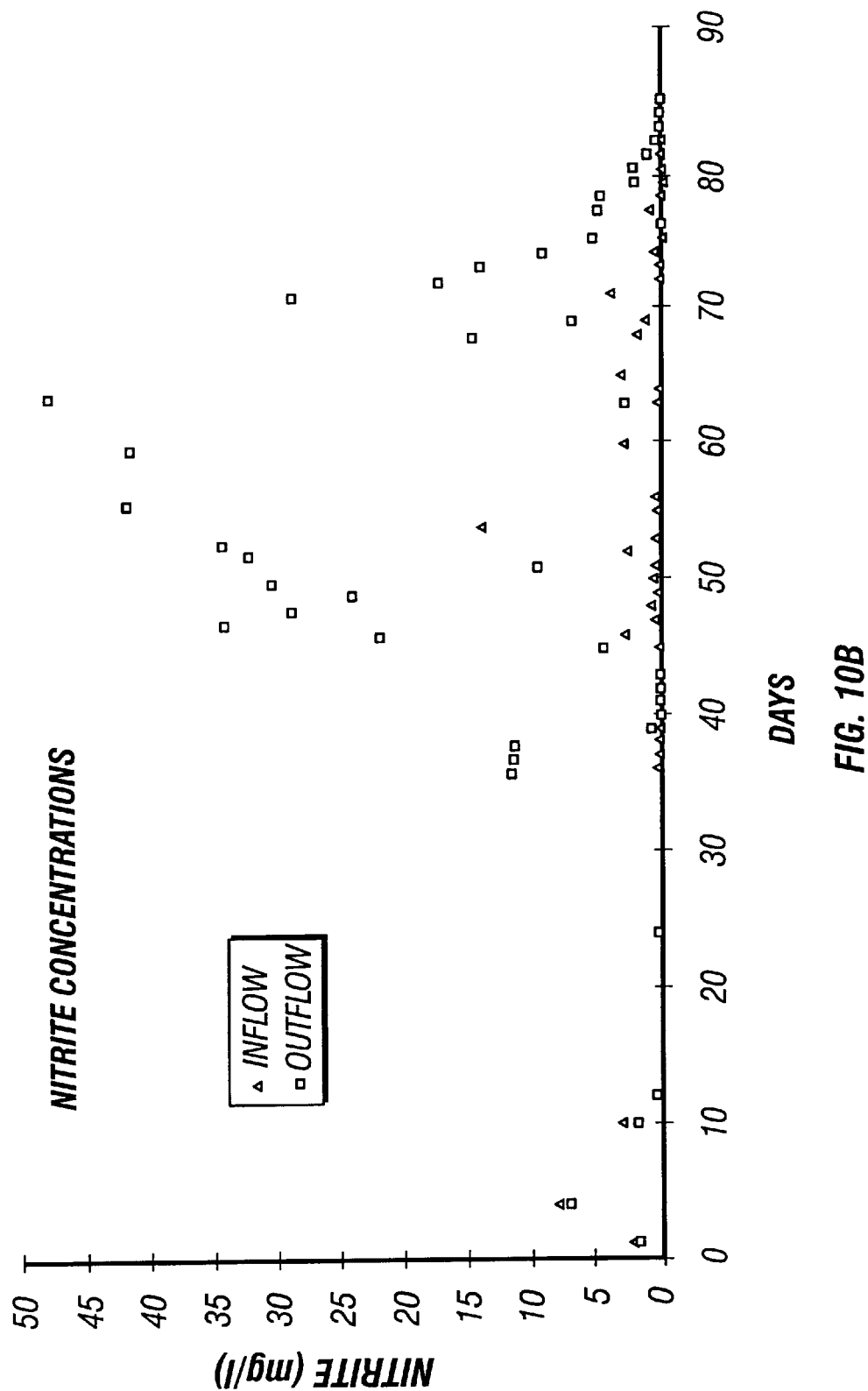
Figure 10C:
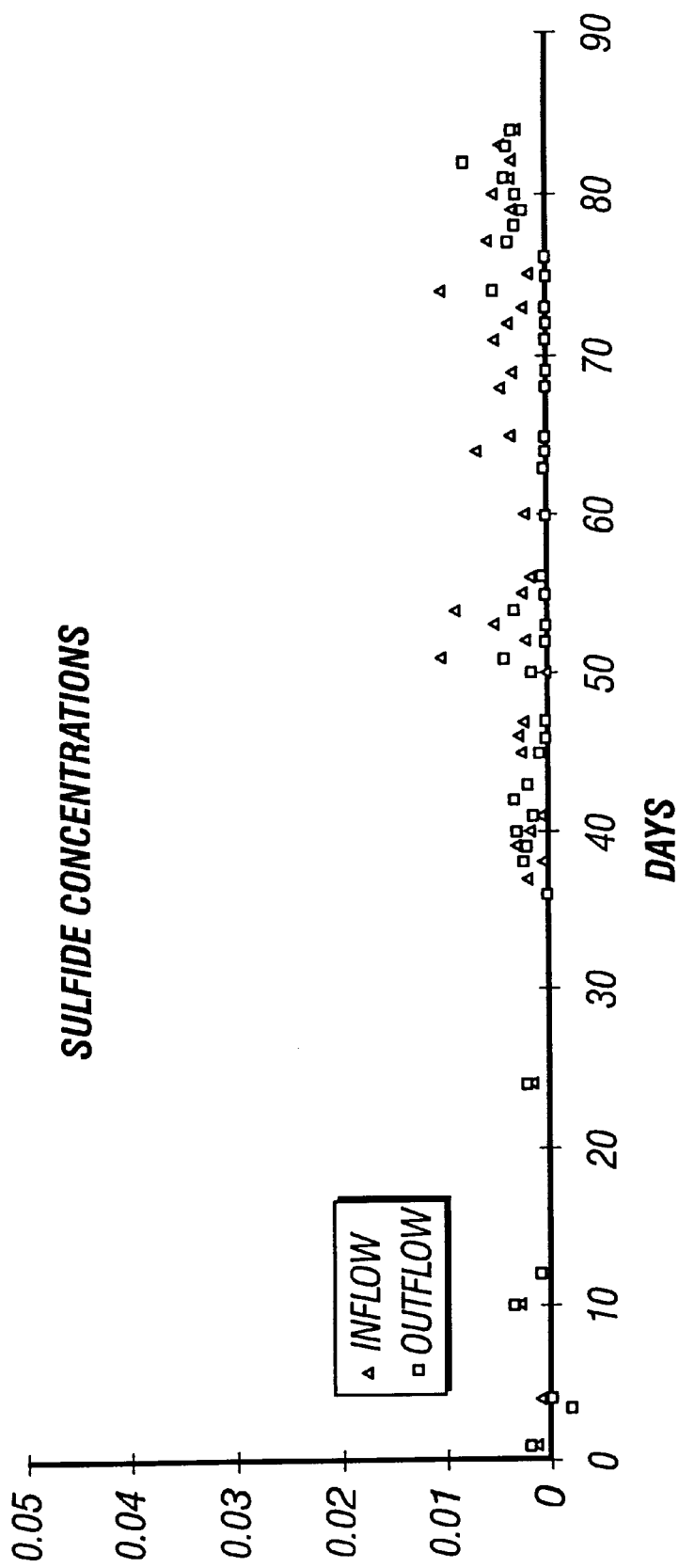

A 5,600 liter (1,480 US gal.) culture system used to culture specific-pathogen-free (SPF) marine shrimp was fully automated and connected to the required filtration (FIG. 9). The system is composed of 2–1,900 L shrimp culture trays 210, a 1.5 hp centrifugal pump 212, a 1 $m^3$ computer automated upflow bead filter 214 (FIG. 7), a 2.7 $m^3$ submerged oyster shell biofilter 216 (FIG. 6), a protein skimmer/foam fractionator 218 (FIG. 5), a 0.05 $m^3$ activated carbon filter 220, 2 ultraviolet sterilizers 222, ozone generator 224 and a denitrifying bioreactor 226. Also included in the system is a water recovery tank 228. The system has been constructed and operated for 2 years. The system has supported shrimp (*Penaeus vannamei* and *Penaeus setiferus*) densities as high as 5,000 $m^2$ for postlarvae and 50 $m^2$ for adult shrimp >15 g. Adult shrimp as large as 20 g have been grown in the system and water quality has been acceptable even during system start-ups (FIG. 10A–FIG. 10C). The water passes from the culture trays through the bead filter, protein skimmer, carbon filter, the submerged biofilter, UV sterilizers and back to culture trays. A side-loop is taken from the trays, passes through the denitrifying bioreactor and returns to the submerged biofilter. This type of system would be equally applicable to the culture of marine flatfish (e.g. flounder or fluke), other crustaceans (e.g. crabs, crayfish or lobsters) and bivalve mollusks (e.g. clams, scallops and oysters).

What is claimed is:

1. A computer automated upflow bead filter system, wherein said system comprises:

a bead bed;

at least one in situ sensor and/or transducer selected from the group consisting of sensors and transducers for monitoring dissolved oxygen, differential pressure across the bead bed, water flow, pH, oxidation-reduction potential and any combination thereof;

a control system operably coupled to said at least one sensor and/or transducer; and an influent conduit below said bead bed and an effluent conduit above said bead bed;

wherein said at least one sensor and/or transducer converts monitored conditions to electrical signals and at least backwashing of the bead bed is continually adjusted in accordance with the electrical signals using the control system.

2. The computer automated upflow bead filter system of claim 1, comprising one or more pH sensors embedded in said bead bed.

3. The computer automated upflow bead filter system of claim 1, comprising one or or more oxidation-reduction potential sensors positioned above said bead bed, one or more oxidation-reduction potential sensors positioned below said bead bed and one or more oxidation-reduction potential sensors embedded in said bead bed.

4. The computer automated upflow bead filter system of claim 1, further comprising an oxygen inlet.

5. The computer automated upflow bead filter system of claim 1, further comprising a buffer inlet.

6. The computer automated upflow bead filter system of claim 1, further comprising a propeller within the bead bed and a propeller motor coupled to the propeller.

7. The computer automated upflow bead filter system of claim 1, wherein said at least one in siru sensor aridor transducer includes at least one in situ sensor and/or transducer for monitoring differential pressure across the bead bed.

8. A computer automated upflow bead filter system, wherein said system comprises:

a bead bed;

at least one in situ sensor and/or transducer selected from the group consisting of sensors and transducers for monitoring dissolved oxygen, differential pressure across the bead bed, water flow, pH, oxidation-reduction potential and any combination thereof;

a control system operably coupled to said at least one sensor and/or transducer; and an influent conduit below said bead bed and an effluent conduit above said bead bed;

wherein said at least one sensor and/or transducer converts monitored conditions to electrical signals and at least dissolved oxygen is continually adjusted in accordance with the electrical signals using the control system.

* * * * *

UNITED STATES PATENT AND TRADEMARK OFFICE
CERTIFICATE OF CORRECTION

PATENT NO. : 6,171,480 B1
DATED : January 9, 2001
INVENTOR(S) : Lee et al.

Page 1 of 1

It is certified that error appears in the above-identified patent and that said Letters Patent is hereby corrected as shown below:

Claim 7, column 20,
Lines 5-6, please delete "one in siru sensor aridor transducer" and insert -- one in situ sensor and/or transducer -- therefor.

Signed and Sealed this

Twenty-fifth Day of September, 2001

Attest:

*Nicholas P. Godici*

NICHOLAS P. GODICI
*Attesting Officer*   *Acting Director of the United States Patent and Trademark Office*